(12) United States Patent
Takagi et al.

(10) Patent No.: US 7,830,601 B2
(45) Date of Patent: Nov. 9, 2010

(54) STEREOSCOPIC IMAGE DISPLAY DEVICE

(75) Inventors: Ayako Takagi, Kanagawa-Ken (JP); Kazuki Taira, Tokyo (JP); Yuzo Hirayama, Kanagawa-Ken (JP); Rieko Fukushima, Tokyo (JP); Tatsuo Saishu, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/940,780

(22) Filed: Sep. 15, 2004

(65) Prior Publication Data

US 2005/0057807 A1 Mar. 17, 2005

(30) Foreign Application Priority Data

Sep. 16, 2003 (JP) ............................... 2003-323531

(51) Int. Cl.
*G02B 27/22* (2006.01)
(52) U.S. Cl. .................... 359/463; 359/462; 348/56; 348/59
(58) Field of Classification Search ................ 359/462, 359/464, 463; 348/51, 54, 56, 59
See application file for complete search history.

(56) References Cited

U.S. PATENT DOCUMENTS

| 4,987,487 A | * | 1/1991 | Ichinose et al. | ............... 348/59 |
| 5,528,420 A | * | 6/1996 | Momochi | .................... 359/463 |
| 5,661,599 A | * | 8/1997 | Borner | ........................ 359/463 |
| 6,061,179 A | * | 5/2000 | Inoguchi et al. | ............. 359/464 |

FOREIGN PATENT DOCUMENTS

| JP | 07-049466 | 2/1995 |
| JP | 10-327430 | 12/1998 |
| JP | 2001-333437 | 11/2001 |

OTHER PUBLICATIONS

Kenji Ido et al., "Ergonomic Evaluation of Readability of High-Resolution TFT-LCDs," Toshiba Review (2002), 57:50-53.
Hoshino, H. et al., "Analysis of Resolution Limitation of Integral Photography", J. Opt. Soc. Am. A, vol. 15, No. 8, pp. 2059-2065, (Aug. 1998).

* cited by examiner

*Primary Examiner*—Audrey Y Chang
(74) *Attorney, Agent, or Firm*—Finnegan, Henderson, Farabow, Garrett & Dunner, L.L.P.

(57) ABSTRACT

The embodiment is to make it possible to increase a resolution obtained when a character or a two-dimensional image is displayed. A stereoscopic image display device is provided with a two-dimensional image display device having a plurality of pixels arranged within a display plane; and a ray control section which is provided in front of or behind the display plane and has a plurality of opening portions or a plurality of lenses arranged side by side, for controlling rays from the pixels, a distance z from the ray control section to a two-dimensional character or a two-dimensional image display position satisfying relationships of $0<z<L \times D/(1+D)/2$ in a projection region and $0<z<L \times D/(1-D)/2$ in a depth region, wherein L represents a viewing distance, Ip represents a pitch of the opening portions or the lenses, $2\theta$ represents a viewing area angle, $p_p$ represents the pitch of the pixels, and D is expressed as $$D = \frac{(l_p)^2}{2 L p_p \tan(\theta)}.$$

10 Claims, 25 Drawing Sheets

STEREOSCOPIC IMAGE DISPLAY DEVICE

CROSS-REFERENCE TO RELATED APPLICATIONS

This application is based upon and claims the benefit of priority from prior Japanese Patent Application No. 2003-323531, filed on Sep. 16, 2003 in Japan, the entire contents of which are incorporated herein by reference.

BACKGROUND OF THE INVENTION

1. Field of the Invention

The present invention relates to a stereoscopic image display device.

2. Related Art

A method for recording a stereoscopic image in any means and reproducing the recorded image as a stereoscopic image called "an integral photography method" (hereinafter, also called "an IP method") or a ray reproducing method which displays many parallax images has been known. It is assumed that an object is viewed by the left and right eyes of an observer. An angle to A point formed by the left and right eyes when A point positioned near to the observer is viewed by his/her left and right eyes is defined as $\alpha$, and an angle thereto formed by the left and right eyes when B point positioned far from the observer is viewed by his/her left and right eyes is defined as $\beta$, $\alpha$ and $\beta$ vary in accordance with a positional relationship between the object and the observer. The ($\alpha$-$\beta$) is called "binocular parallax", and a person is sensitive to the binocular parallax so that he/she can see an object stereoscopically.

In recent years, development of stereoscopic displays of a spectacleless type has been advanced. Though a two-dimensional display is ordinarily used in most of these displays, an angle of rays from a display can be controlled as if the rays are emitted from an object positioned at a distance of several centimeters from the display when the object is viewed from an observer by disposing any ray control element on a front face or a back face of the display and utilizing the previously described binocular parallax. Even if rays of the display are distributed to several kinds of angles (called "parallax") due to high fineness of the display, an image with a high fineness to a certain extent can be obtained on a background.

An outline of a constitution of a display of the spectacleless type stereoscopic displays which gives a parallax in a horizontal direction will be explained. The display is provided with an optical element between a two-dimensional image display device and an observer. A large number of image information obtained when an object is viewed in certain observation directions have been displayed on the two-dimensional display device, so that a stereoscopic image is displayed according to an observation direction by the observer observing an image through an optical plate (a ray control element) which is provided on a front face of a display plane and has opening portions such as slits, pin holes, micro-lenses, a lenticular or the like and a shield portion. Since this stereoscopic display allows a multi-parallax display, even if an observer moves, he/she can view an image corresponding to his/her position. That is, since display of a motion parallax is made possible, natural stereoscopic view is possible. Further, rays reproducing a stereoscopic image trace a route similar to one in a case that a real object has been disposed actually, so that the display performance is excellent in a point that a problem about visual field conflict does not arise.

Now, as a method for producing a parallax image to display the parallax image as respective pixel information through an opening portion, there are roughly two kinds of a method for performing an image mapping by generating rays reproducing a stereoscopic image from a pixel side and a method for performing an image mapping by tracing rays from a view point position of an observer toward pixels in a reverse manner. Here, both the methods are discriminated by calling an image mapping using the former method an IP method and calling the latter method a multi-parallax stereoscope parallax barrier method.

Ray bundles in the IP method are not emitted toward a position of the eyes of an observer but they are emitted from all the opening portions toward the observer at about equal intervals by the number of parallaxes. Therefore, since the IP method is superior in movement parallax when an observer has moved, the number of constituent pixels at an angle where a view point position has been fixed is reduced as compared with a display for an original two-dimensional displaying and a resolution is deteriorated as compared with a stereoscopic display which emits rays toward the positions of the eyes of an observer. In case that any constant resolution is required for a character display or a spherical display having an oblique component to a lens or a slit, in a three-dimensional display for parallel projection which is formed with a lenticular (a slit on a flat plane)+a display device, the resolution is restricted by a pitch of the lenticular, so that it has been difficult to perform a fine character expression or a smooth curve display. Examples devised so as to display a two-dimensional character or a two-dimensional image as a three-dimensional display are as follows:

In an image display method using a lenticular lens, an image display method which can clarify a display position of a stereoscopic image and can set a depth of the stereoscopic image arbitrarily has been proposed (for example, refer to JP07-49466A). In this method, each image of original images on n faces is reduced to a size of 1/n thereof in a direction of enlargement conducted by a lenticular lens, the reduced image is divided into stripe-like images with a width of about 1/n of the width of the lens pitch P of the lenticular lens, and the stripe-like images are sequentially distributed to each unit lens of the lenticular lens so that a composite image is formed. Simultaneously, the composite image is arranged at a predetermined distance from the lenticular lens on the basis of the magnitude of the lenticular lens such that the composite image is enlarged about n times and imaged on a predetermined imaging face through the lenticular lens, so that a display position of a stereoscopic image can be clarified and the depth of the stereoscopic image can be set to a predetermined value by providing a desired burr among the original images on the n faces. The method described in JP07-49466A describes a method for producing a character on an arbitrary display position, but does not describe improvement in character resolution.

Next, a telop display device which is constituted so as to telop-display a character or the like in a digital stereoscopic broadcasting which compresses and processes video signals for left eye and right eye to transmit them, where a telop such as an emergency broadcasting or the like can be displayed on a screen without injuring a stereoscopic feeling of a stereoscopic video image while a stereoscopic broadcasting program is being provided has been provided (for example, refer to JP10-327430A). The telop display device is constituted so as to receive a digital broadcasting at a tuner through an antenna to separate the same into video data, telop data and sound data at a separating circuit. When such a judgement is made by a CPU that data is the telop data, a telop data presence/absence display circuit is lightened on and an viewers sees the lighting to provide a command from a remote controller. Thereby, a video display portion which is displaying a stereoscopic video image based upon a video image for a right eye and a video image for a left eye is switched so that telop information added with a parallax is displayed on a video image display portion. The telop display device describes a circuit system but does not describe an optimal position for a character display.

Finally, an image display device which can display a two-dimensional image on a three-dimensional display device which allows display of a three-dimensional image has been known (for example, refer to JP2001-333437A). The image display device is provided with a three-dimensional display device and a control section which controls the three-dimensional display device. The control section acquires a rendering pattern corresponding to 2-dimensional image data to display the rendering pattern on the three-dimensional display device. The rendering pattern is constituted such that colors obtained when the rendering pattern has been displayed on the three-dimensional display device become artificially equal to colors obtained when two-dimensional image data has been displayed on a two-dimensional display device. The image display device is directed to improvement in image mapping in order to solve such a problem that, when arrangement of parallax images is performed with sub-pixels of R, G and B in a horizontal direction, characters are colored, but it does not describe any improvement in resolution.

In the IP method, when a solid is reproduced at a position separated from a display plane, there arises a problem that a resolution lowers urgently due to spreading of a ray bundle assigned through an opening portion or a lens (for example, refer to a non-patented literature 1 (H. Hoshino, F. Okano, H. Isono and I. Yuyama "Analysis of resolution limitation of integral photography" J. Opt. Soc. Am, A15 (1998) 2059-2065.)).

In the IP method, such a problem that, when a solid is reproduced at a position separated from a display plane, a resolution lowers urgently due to spreading of a ray bundle assigned through an opening portion or a lens will be explained below.

As a scale representing a resolution of a stereoscopic display, $\beta$ (cycle per radian: cpr) is used. $\beta$ is an index indicating the number of cycles of a contrast which can be displayed per radian. As illustrated in FIG. 20, in an IP method, a resolution $\beta_{nyq}$ at a stereoscopic image in the vicinity of a display is called Nyquist frequency, and it is determined depending on a distance from an observer to an opening portion and a pixel pitch viewed through a lens. When an opening portion pitch is represented by $p_e$ and a distance from an observer to an opening portion or a lens is represented by L, the resolution $\beta_{nyq}$ limited by the opening portion pitch $p_e$ is expressed as follows:

$$\beta_{nyq} = L/(2p_e) \quad (1)$$

Next, as illustrated in FIG. 21, when an object 73 is reproduced at a position separated from a display plane, namely at a position separated from an observer 64 by a distance $z_i$, a ray bundle 67 assigned through opening portions 62 or lenses of an optical element 68 is spread so that a resolution is lowered urgently. When the object 73 is reproduced on a region protruded from the display device 61 or on a region in a depth of thereof, the maximum value of a resolution computed from ray group emitted from one slit in order to reproduce an image of the object is represented by $\alpha_{imax}$, a spatial frequency of the object viewed from an observation point is expressed as follows:

$$\beta_{imax} = \alpha_{imax} \times z_i / |L - z_i| \quad (2)$$

Incidentally, L is a distance between the observer 64 and the ray control element 68. Since an actual resolution is a lower one of the above equations (1) and (2), the following equation is adopted.

$$\beta_{imax} = \min(\beta_{imax}, \beta_{nyq}) \quad (3)$$

Here, it will be understood from the equation (1) that according to reduction of the opening portion pitch $p_e$, namely higher fineness of the display plane, the resolution of the stereoscopic image increases. However, there arises a problem that narrowing a pixel pitch of the display plane itself causes a process change or the like so that such a narrowing can not be realized easily. In this connection, in FIG. 21, the ray control element 68 is a slit, and comprises opening portions 62 and shielding portions 63.

Further, in case that there is the stereoscopic image 73 in the vicinity of the display plane, since $\beta_{nyq}$ becomes smaller than $\beta_{imax}$, the resolution of $\beta_{nyq}$ is predominate. Furthermore, as the stereoscopic image 73 is separated from the display plane, since the value of $z_i$ in the equation (2) becomes smaller, so that the resolution of the $\beta_{imax}$ becomes predominate. For example, a resolution determined from the equations (1) and (2) regarding the number of parallaxes and the viewing area angle is illustrated in FIG. 18. In FIG. 18, a horizontal axis z is a distance from an observer to a stereoscopic display object 73, and a display 61 is disposed at a position of Z=1.5 m. A vertical axis indicates a resolution $\beta_{nyq}$ determined by a lens pitch determined according to the equation (1) and a resolution $\beta_{imax}$ determined from a ray density emitted from one lens in a lenticular lens determined according to the equation (2). From FIG. 18, it is understood that since the resolution $\beta_{nyq}$ determined from the lens pitch becomes smaller than the resolution $\beta_{imax}$ regarding an object positioned in the vicinity of a display plane, namely, expressed in a range defined by a projection amount $z_n = 0.12$ m and a depth amount $z_f = 0.13$ m, the resolution $\beta_{nyq}$ becomes predominate, while the resolution $\beta_{imax}$ becomes predominate in a region where the projection amount is larger than $z_n$ and in a region where the depth amount determined depending on a ray density from the opening portion is larger than $z_f$.

From FIG. 18, it is understood that such a problem arises that, since display can not be made at a resolution equal to or more than the Nyquist frequency in a two-dimensional image requiring a high resolution, such as a character, a character with a relatively large size where the lens pitch is defined by one dot must be displayed.

Moreover, there is such a search result that, when the number of constituent dots for a character is 12×12 or more, a character becomes easy to see (for example, refer to TOSHIBA REVIEW Vol. 57 No. 6(2002) "Human engineering research regarding reading easiness of character in highly fine LCD" by Kenji IDO and etc.). Therefore, assuming that the lens pitch is 1.5 mm, when a 12 point character is displayed, one character size becomes 1.5×12=60 mm, so that the character size becomes considerably large, which results in reduction of the number of characters which can be displayed.

FIG. 19A illustrates a ray locus and a constitution of a three-dimensional (stereoscopic) display device which has been viewed from the above. In FIG. 19A, the three-dimensional display device is illustrated to have a two-dimensional display device 1, an optical element 2 such as a lenticular lens or the like, and one pupil 4 of an observer. It is assumed that a display position of a two-dimensional character which attains the maximum resolution is defined on the two-dimensional display device 1. A two-dimensional character displayed on the two-dimensional display device 1 is shown in FIG. 19B. In FIG. 19A, as aspect of main rays 7 of beans to be originally incident on the pupil 4 which is directed to an observer exactly opposed to a front face of the display device 1 is illustrated. For example, in case that the number of parallaxes is 11, as illustrated in FIG. 19C, only the ray 7 of 6 parallaxes at a center enters in the pupil 6. Therefore, since an image obtained by only the main ray 7 entering in the pupil 4 spreads according to the lens width, as illustrated in FIG. 19D, a resolution becomes insufficient, which results in collapse of a character. Similarly, even when the lenticular lens 2 is replaced with a slit, the number of sampling points is reduced, so that it becomes difficult to recognize a character.

SUMMARY OF THE INVENTION

The present invention has been made in view of the above-described circumstances, and an object thereof is to provide a stereoscopic image display device which can display a three-dimensional (3D) image and can increase a resolution when a two-dimensional (2D) image has been displayed.

According to one aspect of the present invention, there is provided a stereoscopic image display device, comprising a two-dimensional image display device having a plurality of pixels arranged within a display plane; and a ray control section which is provided in front of or behind the display plane and has a plurality of opening portions or a plurality of lenses arranged side by side, for controlling rays from the pixels, a distance z from the ray control section to a two-dimensional character or a two-dimensional image display position satisfying relationships of $0 < z < L \times D/(1+D)/2$ in a projection region and $0 < z < L \times D/(1-D)/2$ in a depth region, wherein L represents a viewing distance, Ip represents a pitch of the opening portions or the lenses, $2\theta$ represents a viewing area angle, $p_p$ represents the pitch of the pixels, and D is expressed as $$D = \frac{(l_p)^2}{2 L p_p \tan(\theta)}.$$

In this connection, it is preferable that, when a gap from a plane on which the plurality of opening portions or lenses are arranged side by side to the two-dimensional pattern (image) display means (device) is equal to or larger than a focal length for imaging a locus of rays directed to an observer at the viewing distance on the pixels on the two-dimensional pattern display means, a character or a two-dimensional image is displayed on a projection region from the two-dimensional pattern display device, while, when the gap from a plane on which the plurality of opening portions or lenses are arranged side by side to the two-dimensional pattern (image) display means (device) is smaller than the focal length for imaging a locus of rays directed to an observer at the viewing distance on the pixels on the two-dimensional pattern display means, a character or a two-dimensional image is displayed in the depth region.

Incidentally, in case that one main ray and two or more adjacent parallax images can be seen at a position of an observer existing in the viewing distance via one opening portion or one lens, when the number of parallax images visible through the one opening portion or the one lens is represented as x, when a gap between the one opening portion or the one lens and the two-dimensional pattern display device is equal to or larger than the focal length of the lens, displaying is performed at a position $z_{nopt}$ in the projection region, while, when the gap between the one opening portion or the one lens and the two-dimensional pattern display device is smaller than the focal length of the lens, displaying is performed at a position $z_{fnopt}$ in the depth region. In addition, the position $z_{nopt}$ and the position $z_{fopt}$ are expressed as $z_{nopt} = z_n/(2x)$ and $z_{fopt} = z_f/(2x)$.

Here, it is preferable that $z_n$ and $z_f$ are $z_n = L \times D/(1+D)$ and $z_f = L \times D/(1-D)$.

Incidentally, in case that two main rays and two or more adjacent parallax images can be seen at a position of an observer existing at the viewing distance via one opening portion or one lens, when the number of parallaxes visible to the one opening portion or the one lens is represented as x, when a gap between the one opening portion or the one lens and the two-dimensional pattern display device is equal to or larger than the focal length of the lens, displaying is performed at a position $z_{nopt}$ in the projection region, while, when the gap between the one opening portion or the one lens and the two-dimensional pattern display device is smaller than the focal length of the lens, displaying is performed at a position $z_{fnopt}$ in the depth region. In addition, the position $z_{nopt}$ and the position $z_{fopt}$ are expressed as $z_{nopt} = z_n/x$ $z_{fopt} = z_f/x$ Here, it is preferable that $z_n$ and $z_f$ are $z_n = L \times D/(1+D)$ and $z_f = L \times D/(1-D)$.

In this connection, it is preferable that the position $z_{nopt}$ and the position $z_{fopt}$ are in ranges of $z_n/6 < z_{nopt} < 4z_n/10$ and $z_f/6 < z_{fopt} < 4z_f/10$.

Incidentally, the ray control section comprises a lens. When a thickness of a gap between the lens and the two-dimensional image display device is represented as g and a focal length of the lens is represented as f, it is preferable that the ray control section is in a rang of $f + 1.24 \times (f \cos \theta \times p_p)/Ip < g < f + 3 \times (f \cos \theta \times p_p)/Ip$, or $f - 1.24 \times (f \cos \theta \times p_p)/Ip < g < f - 3 \times (f \cos \theta \times p_p)/Ip$.

In this connection, it is preferable that the gap between the ray control section and the two-dimensional image display device is constituted to be different between a stereoscopic display region and a character display region.

According to the present, a three-dimensional image can be displayed and a resolution obtained when a two-dimensional image is displayed can be increased.

DESCRIPTION OF THE EMBODIMENTS

Embodiments of the present invention will be explained in detail below with reference to the drawings.

First Embodiment

Figure 1A:
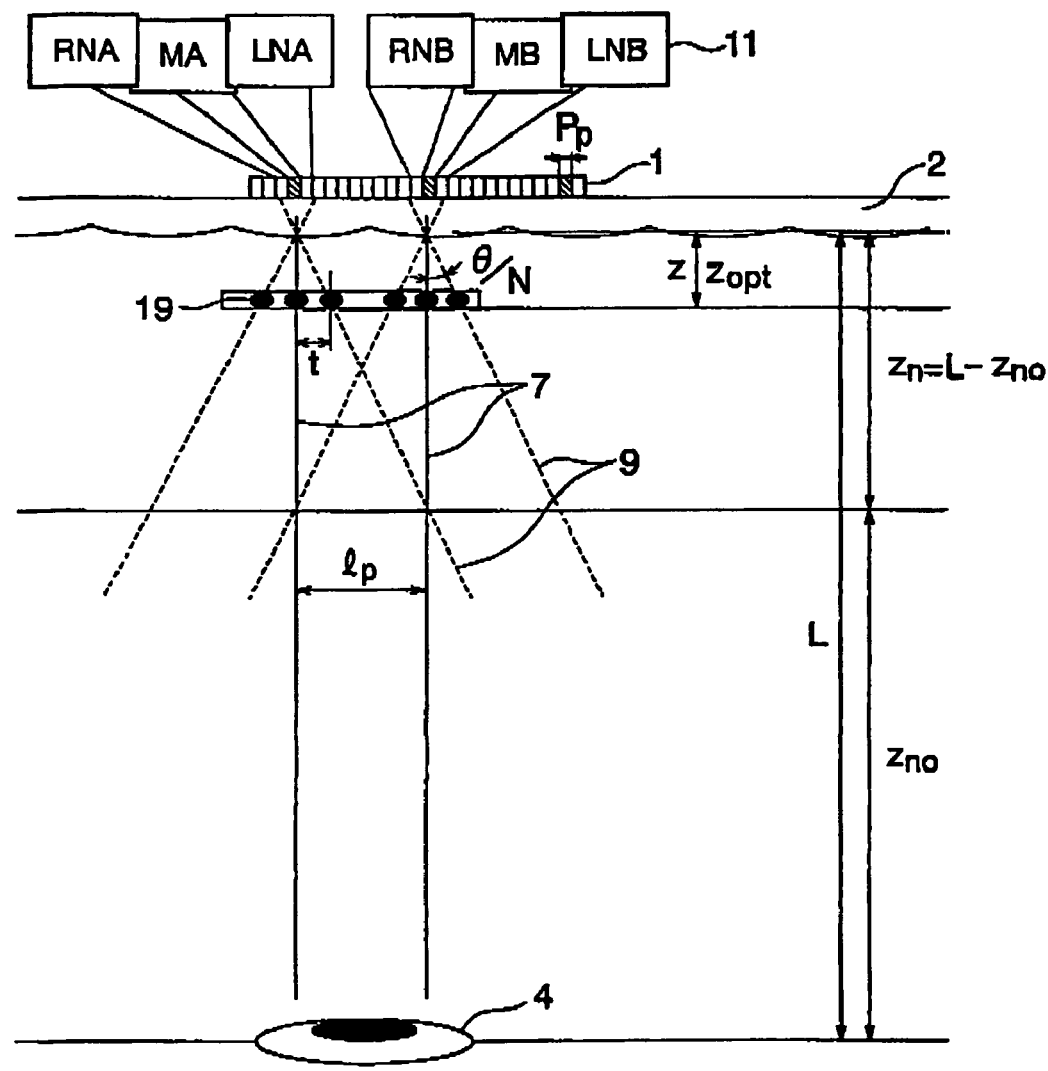
FIG. 1A is a plan view illustrating a constitution of a stereoscopic image display device according to a first embodiment.
Figure 1B:
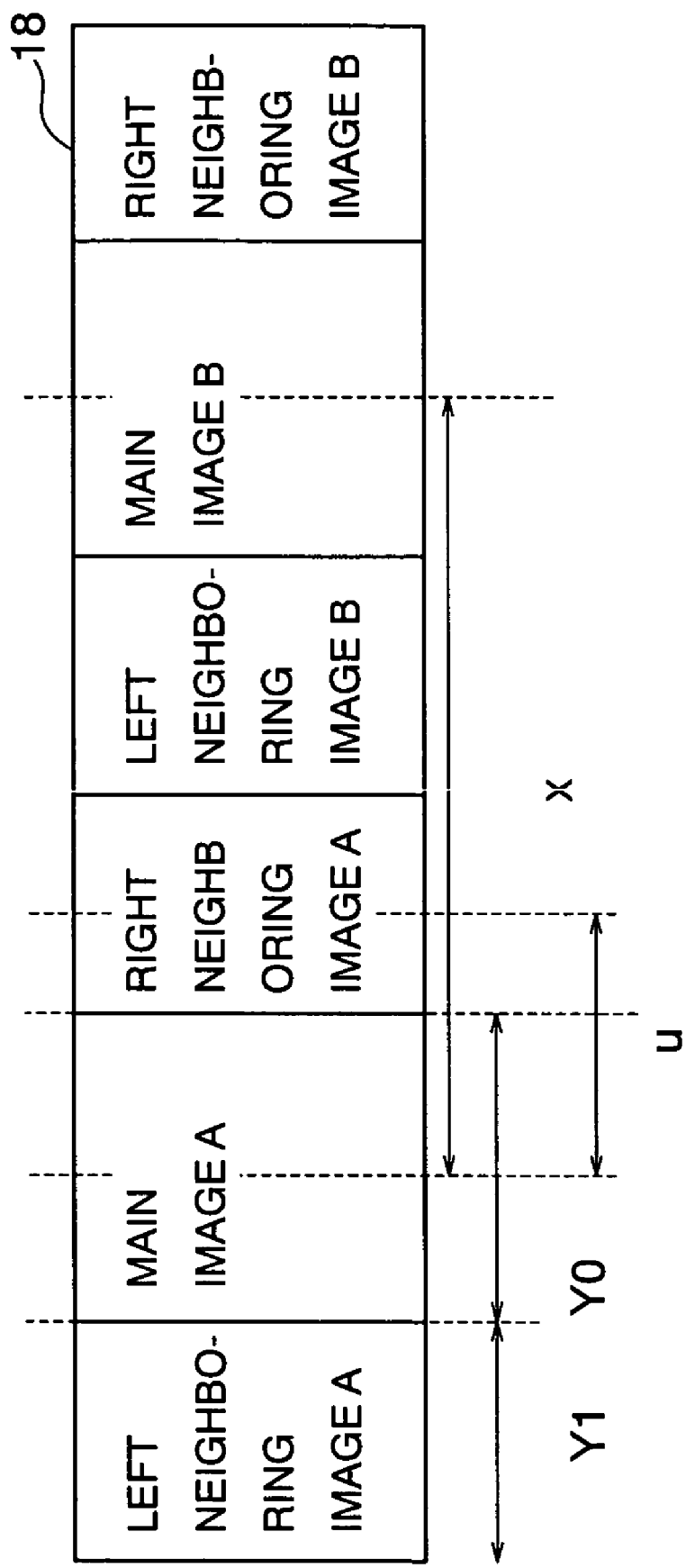
FIG. 1B is a diagram illustrating a ratio of an image due to a main ray and an image due to a neighboring parallax which enter in a pupil of an observer.

A constitution of a stereoscopic image display device according to a first embodiment of the present invention is illustrated in FIGS. 1A and 1B. FIG. 1A is a plan view illustrating a constitution of a stereoscopic image display device according to the first embodiment. The stereoscopic image display device according to this embodiment is provided with a two-dimensional image display device 1 and an optical element 2. The two-dimensional image display device 1 is, for example, a liquid crystal display device and is provided with a display plane with a plurality of pixels for displaying a two-dimensional image. The ray control element 2 is provided on a front face of the two-dimensional image display device 1 and has a plurality of lenses for control directions of rays from the plurality of pixels on the display plane.

In the stereoscopic image display device of this embodiment, when a character or a two-dimensional image is displayed, a distance $z_{opt}$ from the ray control element 2 to a display position of a two-dimensional image to be displayed meets the following condition.

$$0 < z_{opt} < L/(1+D)/2 \qquad (4)$$

Here, L is a distance from an observer to the ray control element 2, namely, a viewing distance, and D is called "depth factor" and it is obtained from the following equation (5)

$$D = L/2 p_p (L/l_p)^2 \tan\theta \qquad (5)$$

Here, Ip is a lens pitch of the ray control element 2, $p_p$ is a pixel pitch, and θ is a half of a viewing area angle. Derivation of the equations (4) and (5) will be explained below.

As described above, the IP (integral photography) system is a system where a stereoscopic view is achieved utilizing the both eye parallax by distributing rays to a certain plurality of determined viewing area angles by the ray control element irrespective of a position of an observer from a certain opening portion. When a lenticular lens is utilized as the ray control element, as an assignment method of parallax images in FIG. 1A, collimated rays depending on an angle is emitted from one lens 2 according to a curvature of the lens 2 by putting the lenticular lens 2 on a front face of the display device 1 and setting a focus of the lens at a pixel position of the display device 1. At this time, when the viewing area angle is represented as 2θ and the number of parallaxes is represented as N, a visible area per parallax is expressed as follows:

Viewing area angle/number of parallaxes=2θ/N  (6)

Now, it has been considered that only one of rays from neighboring parallaxes enters in a pupil of an observer. It is called "crosstalk" that two or more rays enter in the pupil, which results in deterioration of image quality. However, at present, high fineness of a liquid crystal display advances and multi-parallax of ten or more parallaxes can be realized so that a viewing area angle per parallax becomes small. In addition of increase of the number of parallaxes, a ray is spread due to influences of a pixel width of a liquid crystal display device serving as the two-dimensional image display device 1, a diffusion film for moire prevention and a defocus of a lens, so that neighboring parallax images also enter in the pupil of a person.

In FIG. 1A, reference numeral 11 denotes a parallax image on a display plane of the two-dimensional image display device 1 and reference numeral 19 denotes a two-dimensional character or image displayed on a projection region. The image 11 includes parallax images comprising RNA, MA, LNA, RNB, MB and LNB. MA is defined to a main image which must be planned to see from observer, of one lens 2, RNA is an image adjacent to the main image MA on the right side, and LNA is an image adjacent to the main image MA on the left side. MB is a main image of a lens adjacent to the lens 2 whose main image is the image MA, RNB is an image adjacent to the main image MB on the right side, and LNB is an image adjacent to the main image MB on the left side.

FIG. 1B illustrates a ratio of an image obtained by the main ray 7 and an image due to neighboring parallaxes which enter in the pupil 4. FIG. 1B shows a case that two neighboring parallax image rays adjacent to a main ray to each other and the main ray is defined as a parallax angle originally assigned as a ray from one lens. When the number of parallaxes including a main ray which can be seen between main rays adjacent to each other is represented as x (parallax). A ratio where the main ray 7 occupies is represented as Y0 (=1 parallax), and a ratio where one neighboring parallax image occupies is represented as Y1 (parallax), the following is obtained.

Image width due to main ray:image width due to neighboring parallax ray=1:2×Y1=1:(x−1).

When a ratio where a neighboring parallax image can be seen is defined as crosstalk amount, the following is obtained.

Crosstalk amount=(x−1)/x  (7)

As understood from FIG. 1B, when information about points for making interpolation between main rays adjacent to each other is displayed at a position where neighboring parallax images can be seen, a character with improved resolution can be seen.

First, in case that neighboring parallax images interpolate the main ray 7, neighboring parallax rays must pass through sides closer to the main rays than a center point of the main rays 7 adjacent to each other at the two-dimensional character and image at the projection region in FIG. 1A. This is because, when a deviation t between a neighboring parallax ray and a main ray at a stereoscopic image display position becomes larger than one half of the lens pitch Ip, neighboring parallax rays 9 from lenses adjacent to each other cross at a position of the eyes 4 of the observer so that an image obtained looks a double image. In view of these circumstances, when a projection position where a neighboring parallax ray 9 from one lens crosses a main ray 7 from a lens adjacent thereto is represented as $Z_n$, the optimal position $Z_{opt}$ for displaying a two-dimensional character or image must meet the following condition according to a geometrical condition in FIG. 1A, $$Z_{opt} < Z_n/2 \quad (8)$$

Here, how to obtain $z_n$ will be explained. Though the definition of $z_n$ has been described in the paragraph "SUMMARY OF THE INVENTION", in case that a three-dimensional display is viewed in a viewing distance, the $z_n$ is a position where a resolution determined from a lens pitch (Nyquist frequency) becomes equal to a resolution determined from ray density radiated from one lens. In this embodiment, since a parallax angle between the main ray 7 and the ray 9 for the neighboring parallax image are always the same, a two-dimensional character or image can be obtained not only from the front face but also from a changed view angle.

According to equation (6) described in the non-patented literature 1, the depth factor D is defined as $$D = \alpha_{imax}/\beta_{nyq} \quad (9)$$

According to the equation (3), when $z_n$ is the projection amount, the following equation is satisfied.

$$\alpha_{imax} \times z_{no}/|L-z_{no}| = \beta nyq \quad (10)$$

Here, though the viewing distance L is shown in FIG. 1A, the viewing distance is a distance between the eyes 4 of the observer and the ray control element 2. The viewing distance is a computational viewing distance used when two-dimensional mapping data displayed on a second-dimensional display device is prepared in order to display a three-dimensional image and an eigen value inherent to image data, but it does not indicate a position of an arbitrary observer. Here, in the projection region, by transforming the equation (10) from the condition of $L-z_{no}>0$, the position $z_n$ meeting $\beta_{nyq} = \beta_{imax}$ becomes $D \times z_{no}/(L-z_{no})=1$, namely $D \times z_{no} = L - z_{no}$, and therefore $$z_{no} = L/(1+D) \quad (11)$$

When the reference is written to not a position from the eyes 4 of the observer but the projection amount $z_n$ from the ray control element 2 existing on the front face or back face of the display plane, the projection amount meeting $z_n = L - z_{no} = L \times D/(1+D)$ becomes approximately equal to $z_n$ shown in FIG. 1A.

According to an equation (36) in the non-patented literature 1, in the maximum pixel pitch, $$D = \frac{(l_p)^2}{2Lp_p\tan(\theta)} \quad (12)$$

is obtained. That is, the equation (6) is obtained.

By substituting the equation (11) for the equation (8), as previously described, the optimal position of a two-dimensional character becomes $$0 < z_{opt} < L/(1+D)/2$$

$$D = \frac{(l_p)^2}{2Lp_p\tan(\theta)}$$

Until now, the fact that the projection position is determined in the projection region such that the neighboring parallax images are positioned so as to interpolate a space between main rays has been explained.

Next, a stereoscopic character displayed in the projection region using a specific character and an image entering in the eyes of an observer have the same in left and right directions, a smooth display easy to see can be obtained will be explained with reference to FIGS. 4A to 4D. A depth limitation in a character display region will be explained later.

Figure 4A:
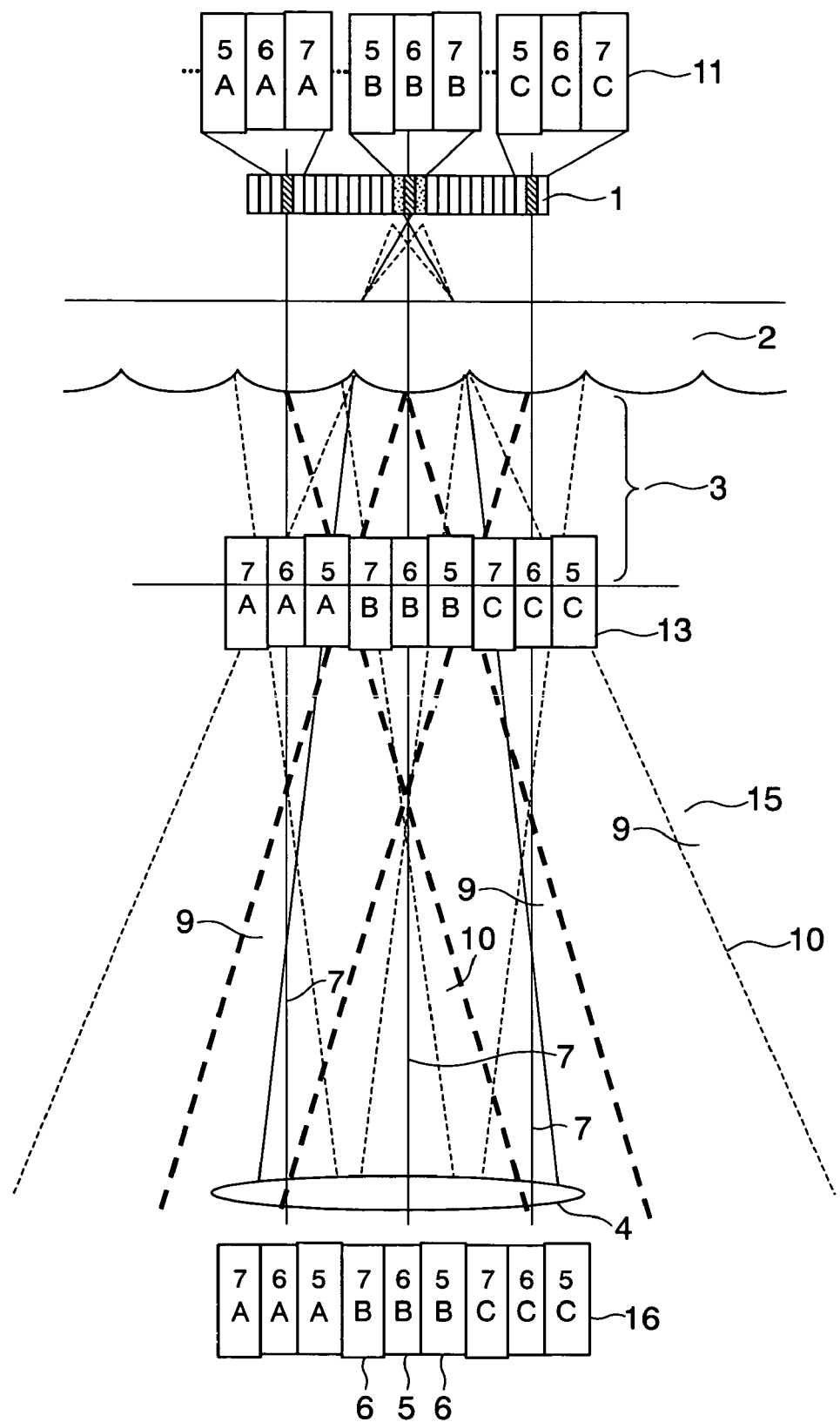
FIG. 4A is a view for explaining a parallax number on a two-dimensional image display device which a two-dimensional character or a two-dimensional image is projected on, and FIG. 4B is a elemental image array on the two-dimensional image display device.

FIG. 4A is a view illustrating which parallax number on the two-dimensional image display device 1 which the character or image is projected on or how the character or the image appears in the pupil 4 of an observer, when a two-dimensional character or a two-dimensional image is displayed in the projection region. In this connection, the parallax number of the main ray 7 is defined as parallax-6, a left neighboring parallax number adjacent thereto is defined as parallax-5, and a right neighboring parallax number adjacent thereto is defined as parallax-7. A central lens is represented as B, a left lens is represented as A, and a right lens is represented as C.

Image data pieces mapped on a liquid crystal display which is the two-dimensional display device 1 in the order of 5A, 6A, 7A, . . . 5B, 6B, 7B, . . . 5C, 6C, 7C correspond to positions of 7A, 6A, 5A, . . . 7B, 6B, 5B, . . . 7C, 6C, 5C in a stereoscopic display object in the projection region. Since the positional relationship is maintained even at a position of the eyes of an observer, a ray entering in the pupil 4 includes neighboring parallax image data and it becomes 7A, 6A, 5A, . . . 7B, 6B, 5B, . . . 7C, 6C, 5C, so that a right interpolated image can be seen in the stereoscopic display object. In this connection, in FIG. 4A, reference numeral 3 denotes a region where a neighboring parallax ray is within ½ of an interval between main rays, reference numeral 5 denotes a region where the main ray 7 can mainly be seen, reference numeral 6 denotes a region where a neighboring parallax can mainly be seen, reference numeral 9 denotes a locus of a central portion of a neighboring parallax ray, reference numeral 10 denotes a region where the main ray 7 due to spreading of a neighboring parallax ray can be seen, reference numeral 11 denotes a parallax image displayed on a display plane of the two-dimensional image display device 1, reference numeral 13 denotes a position where a two-dimensional character is displayed and assignment of a parallax number to the position, and reference numeral 15 denotes a position where a neighboring parallax image and a main ray 7 crosses each other.

Figure 4B:
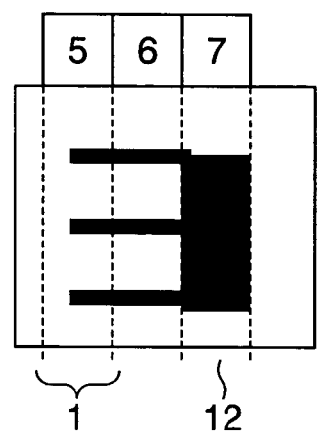
FIG. 4C is a character image at the position 13 in FIG. 4A which show horizontal positions of the view illustrating locus of some parallax rays.
FIG. 4D is a view illustrating two-dimensional character entering in the pupil of an observer.
Figure 4C:
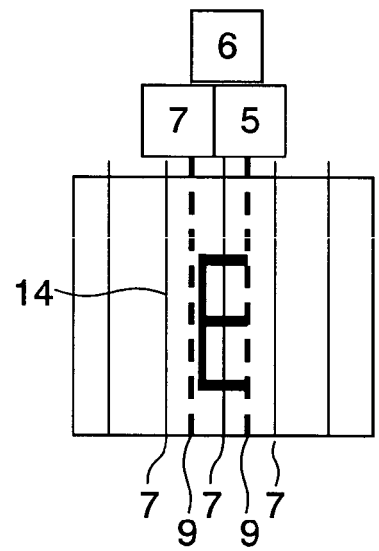
Figure 4D:
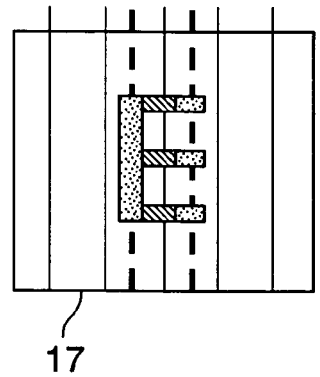

FIGS. 4B, 4C and 4C are views for explaining how a character "E" displayed on one example is represented on the two-dimensional image display device 1 (refer to FIG. 4B), including how the character enters in the eyes of an observer (refer to FIG. 4D). It is understood from FIG. 4C that only one of main rays passes through the character "E" but three parallax rays including a neighboring parallax ray pass through the character "E". FIG. 4B illustrates a pattern image of the character projected on the two-dimensional image display device but an image where left and right parallax images have been reversed appears in one lens of the lenticular lens. When the image is seen at a position of an observer via a lens, the image can be observed as a normal character like a character shown in the projection region, as illustrated in FIG. 4D. Further, it is understood that the neighboring parallax image supplements the main ray so that the image can be recognized as a character.

In the above explanation, an image to be displayed has been formed in the projection region, namely, in a region between the ray control element 2 and the observer, but a case that an image is formed in a rear region of the two-dimensional image display device 1, that is, in the depth region will be explained.

Figure 5:
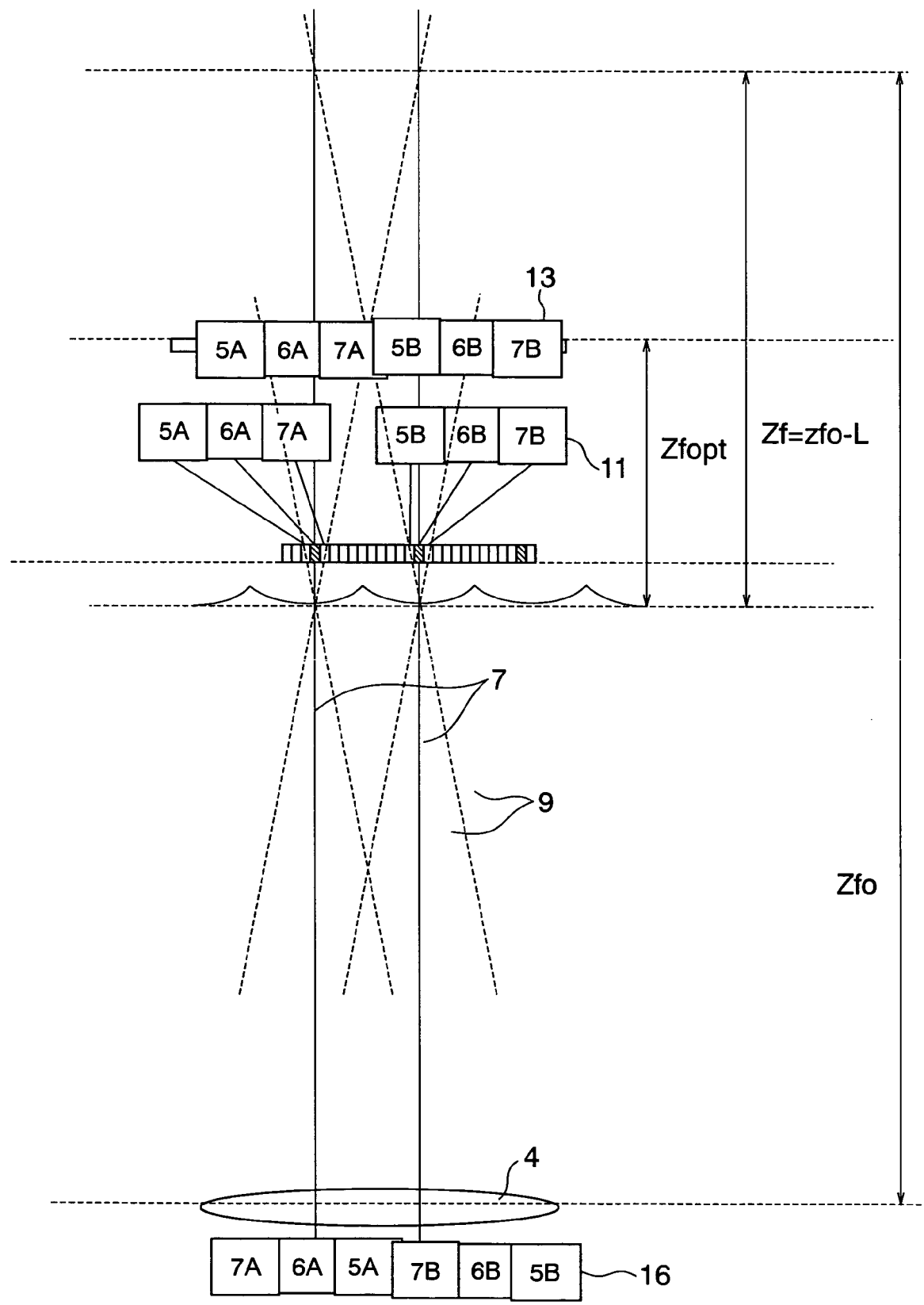
FIG. 5 is a view illustrating locus of rays when a two-dimensional character has been displayed in a depth region in the first embodiment.

FIG. 5 is a view explaining how a two-dimensional character or a two-dimensional image displayed in a depth region is projected on a parallax number on the two-dimensional image display device 1 by the parallax number and how the character or image appears on the pupil 4 of an observer. A parallax number of a main ray 7 is defined as parallax-6, a left neighboring parallax number adjacent thereto is defined as parallax-5, and a right neighboring parallax number adjacent thereto is defined as parallax-7. A central lens is represented as B, a left lens is represented as A, and a right lens is represented as C.

On the two-dimensional image display device 1, when the parallax numbers are arranged in the order of 5A 6A 7A . . . 5B 6B 7B . . . 5C 6C 7C, they are arranged in the order of 5A 6A 7A . . . 5B 6B 7B . . . 5C 6C 7C in the stereoscopic image display device in the depth region. Since their positional relationship is reversed at a position of the eyes 4 of an observer, arrangement is made in the order of 7A 6A 5A . . . 7B 6B 5B . . . 7C 6C 5C.

Therefore, since left and right neighboring parallax numbers entering in the eye 4 are reversed from the two-dimensional character in the stereoscopic image, a right interpolated image can not be seen.

Since the ray passing through the center of the lens has been considered until now, it has been described that the character display in the projection region is normal regarding the image of the adjacent parallax image but left and right of the character display in the depth region are reversed. These conditions have been considered regarding the case that the focal length of a lens and a distance from a surface of the lens 2 to the two-dimensional image display device 1 are equal to each other. However, in case that a lens is defocused, it is insufficient to consider the ray locus on only the center.

Second Embodiment

Next, a stereoscopic image display device according to a second embodiment of the invention will be explained with reference to FIG. 6 to FIG. 8. The stereoscopic image display device of this embodiment is considered regarding a thickness of a lens.

Figure 6:
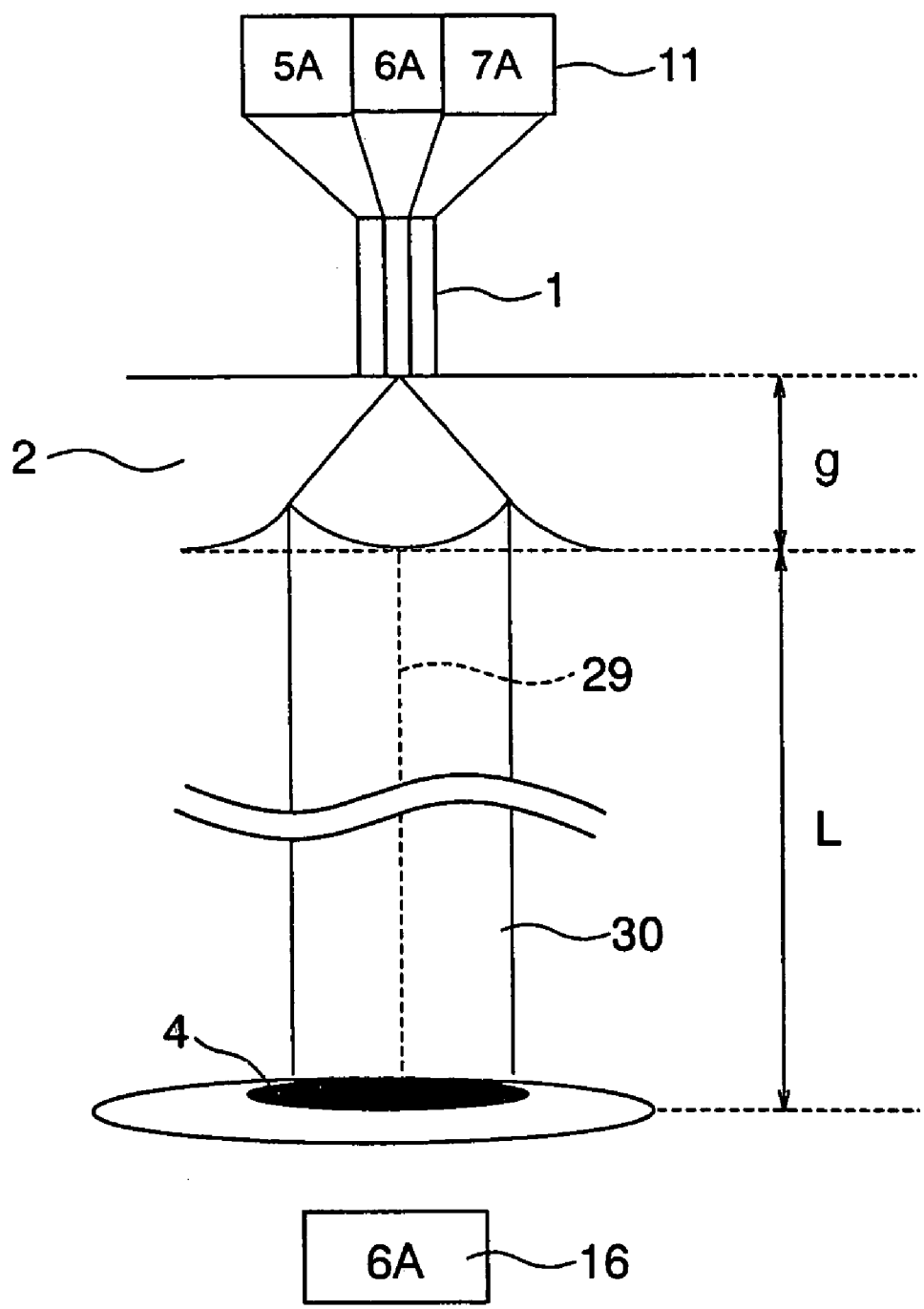
FIG. 6 is a plan view of the stereoscopic image display device in case that a focal length of a lens and a gap are equal to each other.

FIG. 6 is a plan view of a lenticular viewed from above in case that a focal length of a lens and a distance q from a surface of a lens 2 to a two-dimensional image display device 1 (hereinafter, called "a gap g") are equal to each other. In FIG. 6, reference numeral 11 denotes a parallax number on a two-dimensional image display plane, reference numeral 29 denotes an image from a center position of a lens, and reference numeral 30 denotes an image from an edge of the lens. It is understood from FIG. 6 that, when rays of neighboring parallax image are put out of consideration, a locus of a main ray entering in the eye 4 includes only 6 parallaxes in the two-dimensional image display device. When ray density from one lens 2 is high, a neighboring parallax image enters in the eye of an observer, as discussed above.

Next, a case that the gap g is not equal to the focal length of the lens will be explained. First, as illustrated in FIG. 7, a case that the gap g is larger than the focal length of a lens will be considered. As illustrated in FIG. 7, since neighboring parallax images reversed regarding left and right enter in an eye of an observer, an image with left and right reversed to arrangement of a liquid crystal display device serving as the two-dimensional image display device 1 is obtained as an image per lens. As described regarding FIG. 4A to FIG. 4D, since arrangement of the liquid crystal image display device and a stereoscopic image are reversed regarding left and right in the projection region, the same relationship as the above is obtained, so that, when displaying is performed in the projection region, the neighboring parallax images interpolate the main ray. Here, in case of a proximity region, a region defocused is represented with a geographical relationship.

Figure 7:
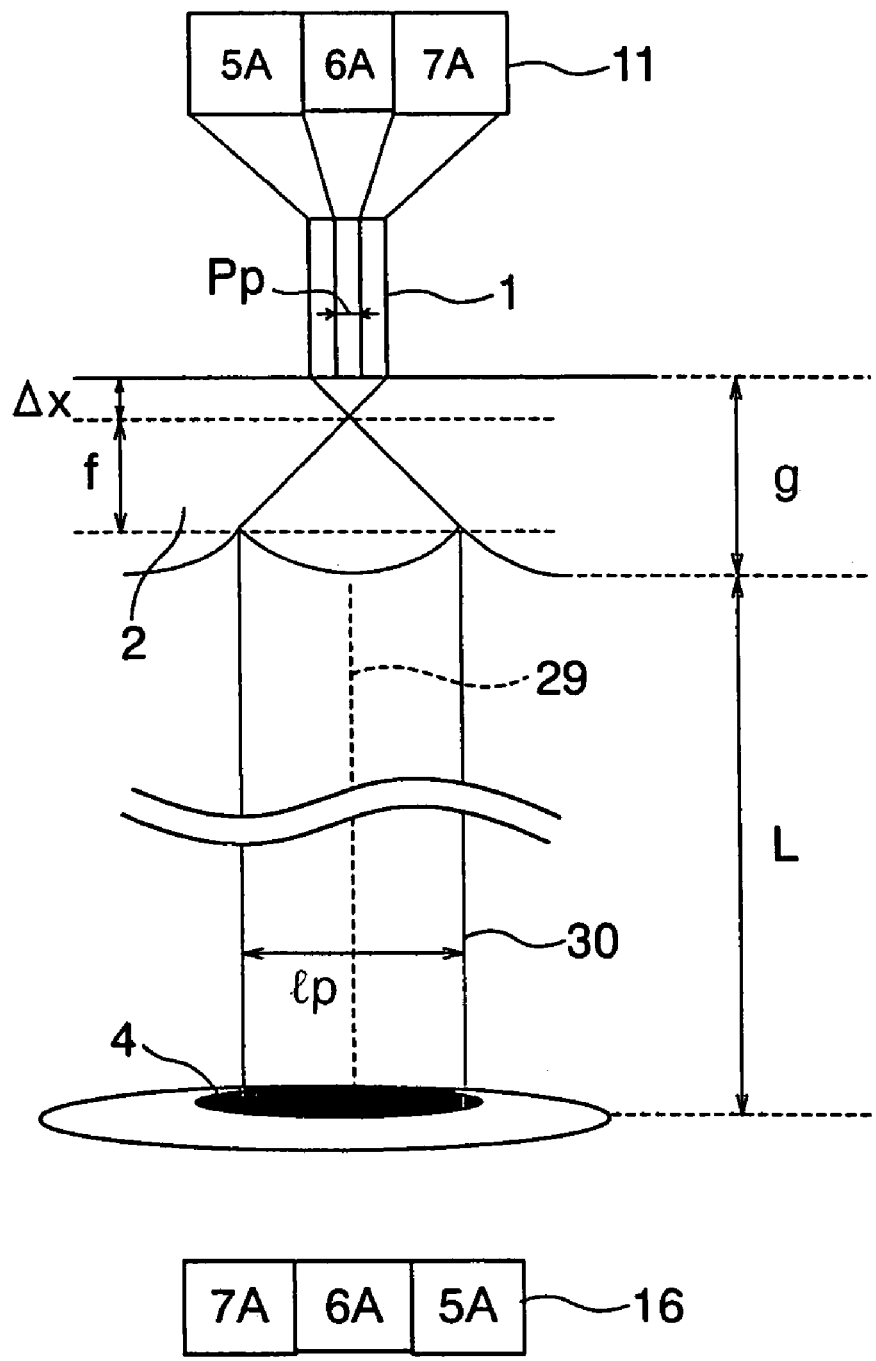
FIG. 7 is a plan view of the stereoscopic image display device in case that the gap is thicker than the focal length of the lens.

In FIG. 7, when the focal length of a lens is represented as f, a lens pitch is represented as Ip, an increment of a gap g is represented as $\Delta x$, the number of elemental image pixels defocused in the two-dimensional display is represented as $\Delta p_n$, a viewing area angle is represented as $2\theta$, and a pixel pitch of the two-dimensional image display device 1 is represented as $p_p$, in case of a spherical lens, the following is obtained according to $$g = f + \Delta x$$

$f \cos \theta : Ip = \Delta x : \Delta p_n \times p_p$. Therefore, the following is obtained.

$$\Delta p_n = Ip \times \Delta x / (f \cos \theta \times p_p) \tag{13}$$

On the basis of the above, a defocus region on the two-dimensional image display device 1 can be estimated.

Figure 8:
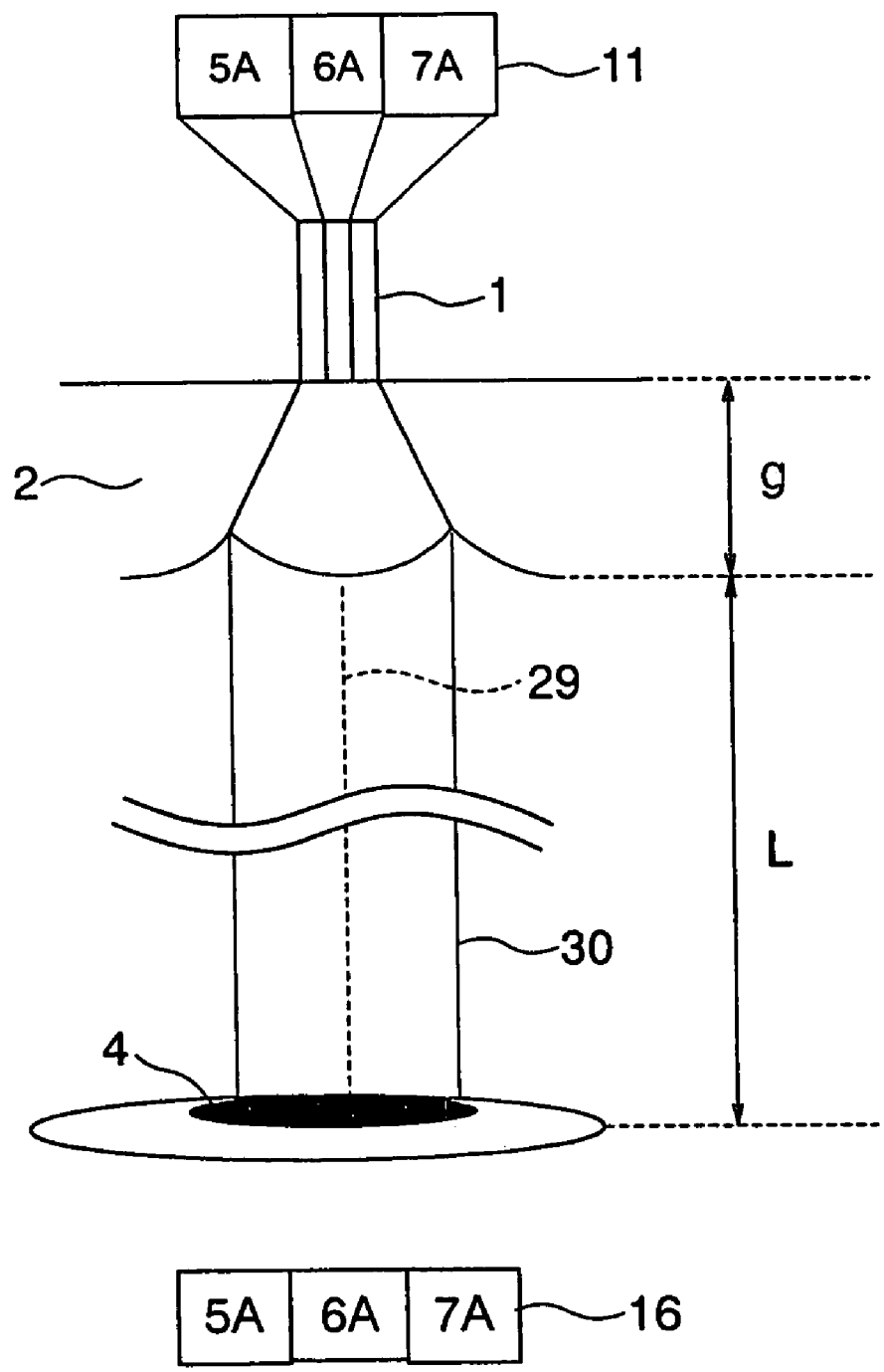
FIG. 8 is a plan view of the stereoscopic image display device in case that the gap is smaller than the focal length of the lens.

Next, as illustrated in FIG. 8, a case that the gap g is smaller than the focal length of the lens 2 will be considered. As understood from FIG. 8, since the relationship of the image between the left and right neighboring parallax images enter in the eye 4 of an observer as they are, keeping the same arrangement of image on the liquid crystal display device 1 is obtained as an image per lens. As described regarding FIG. 5, in case of the depth region, left and right directions of the arrangement of the liquid crystal display device 1 and those of the stereoscopic image are equal to each other. For this reason, since the same relationship as the above is obtained, when displaying is performed in the depth region, neighboring parallax images interpolate a main ray. It is understood from FIG. 8 that, when the gap g is smaller than the focal distance, even if displaying is performed in the depth region, displaying can be performed without reversing left and right as the neighboring parallax images interpolate a space between adjacent rays.

Like the case in FIG. 7, when a defocus region of the two-dimensional display device 1 is obtained with a paraxial ray according to geographical conditions, $$g = f - \Delta x$$

$f \cos \theta : Ip = \Delta x : \Delta p_n \times p_p$.

Therefore, the following is obtained.

$$\Delta p_n = Ip \times \Delta x / (f \cos \theta \times p_p) \tag{14}$$

The following will be understood from FIG. 7 and FIG. 8. In the stereoscopic image display device described in the second embodiment, in case that a gap from an optical plate 2 to the two-dimensional image display device 1 is equal to or larger than the focal length of the lens 2 for imaging a locus of a ray directed toward an observer in a viewing distance L from elemental image array of the two-dimensional image display device 1, a smooth character or a smooth two-dimensional image is displayed in the projection region on the side of the observer viewed from the two-dimensional image display device 1. On the other hand, in case that the gap g is smaller than the focal length of the lens 2 for imaging a locus of a ray directed toward an observer in the viewing distance L from elemental image array of the two-dimensional image display device 1, when a character or a two-dimensional image is displayed in the depth region, a smooth character display can be performed.

Even in a case that display is performed in the depth region, like the projection region in FIG. 1A, when the optimal distance $z_{fopt}$ for displaying a two-dimensional image from the optical plate 2 becomes a depth region equal to or longer than one half of coordinate $z_f$ of a position z where a ray of a neighboring parallax image and neighboring main ray crosses, there arises a problem that an image becomes a double image easily. For this reason, by meeting $$z_{fopt} < z_f / 2 \tag{15},$$

A correct interpolation image can be supplemented at a correct position. Here, an equation meeting $z_f$ is obtained.

In the depth region, first, it is assumed that a position meeting a condition of $\beta_{nyq} = \beta_{imax}$ is defined as $z_f$. Here, the viewing distance is represented as L in FIG. 5, but the viewing distance means a position of an observer, which is required when two-dimensional mapping data in the two-dimensional image display device 1 of the three-dimensional stereoscopic imaging apparatus is prepared.

In the depth region, when the distance from an observer in the viewing distance L is represented as $z_{fo}$, the position $z_f$ meeting $\beta_{nyq} = \beta_{imax}$ is obtained as follows:

According to $z_{fo} - L > 0$, the equation (10) is transformed, so that $$D \times z_{fo} / (z_{fo} - L) = 1$$

is obtained, namely, $$D \times z_{fo} = z_{fo} - L$$

is obtained, and therefore $$z_{fo} = L / (1 - D)$$

is obtained. When the reference is written to not the position from the observer but the projection amount from the ray control element on the display plane or the rear plane, $$z_f = z_{fo} - L = L \times D / (1 - D)$$

is obtained.

As the above is summarized, like the first embodiment, in the projection region, $$0 < Z < L \times D / (1 + D) / 2$$

is obtained, and in the depth region, $$0 < Z < L \times D / (1 - D) / 2$$

is obtained.

Here, by performing a character display at a position where the depth factor D meets $$D = \frac{(l_p)^2}{2Lp_p\tan(\theta)}$$

A smooth character display utilizing neighboring parallax images can be performed.

Third Embodiment

Next, a stereoscopic image display device according to a third embodiment of the invention will be explained with reference to FIG. 1B. In FIG. 1B, X denotes the number of parallaxes which can be seen per lens pitch, Y0 denotes the number of parallaxes which can see a main ray and one parallax, and Y1 denotes a ratio where a neighboring parallax image on one side can be seen.

$X>3:Y1=1$ $1<X<3:Y1=(X-1)/2$ $0<x<1:Y1=0$ (16)

are obtained.

Figure 3:
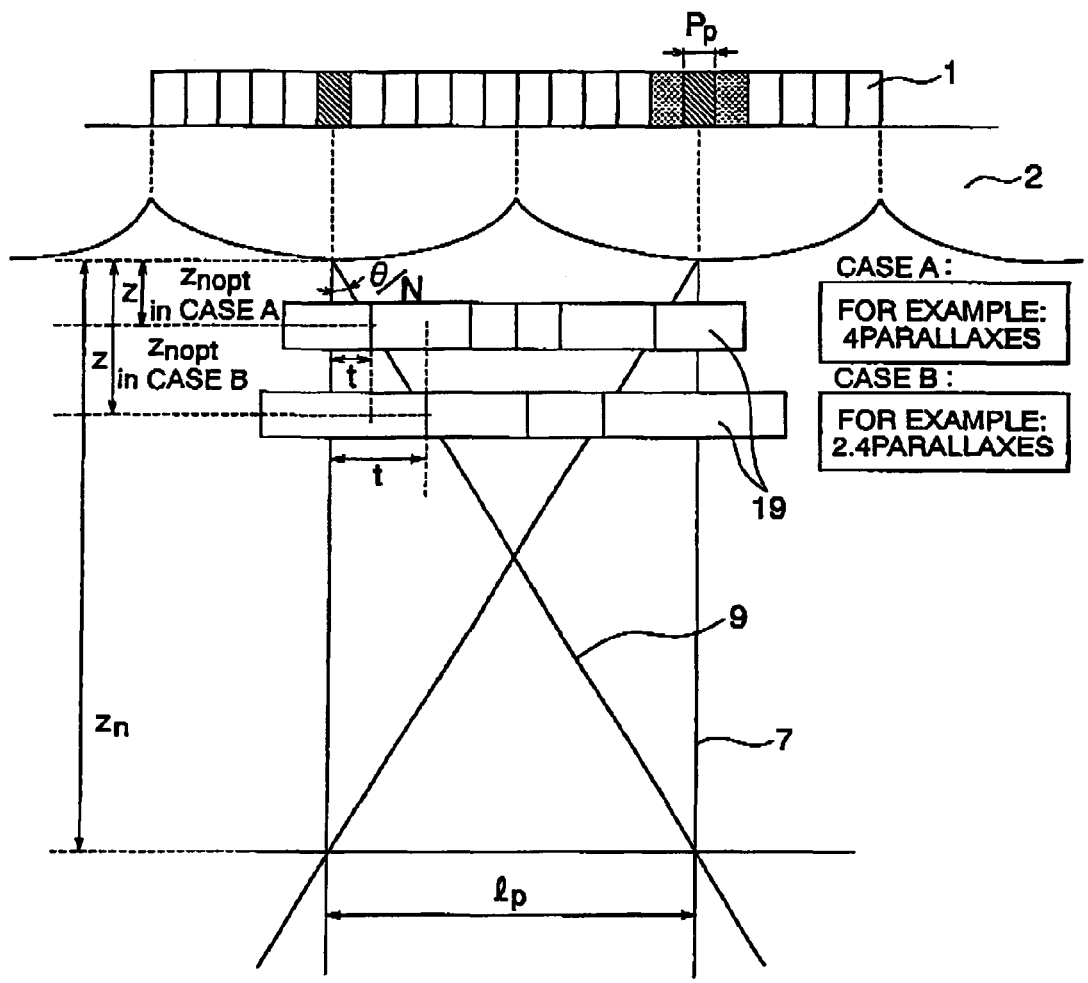
FIG. 3 is a view illustrating a constitution of an optimum display position of a character according to a third embodiment.

Next, using FIG. 3, a relationship between a ratio where neighboring parallax images can be seen and the optimal display position will be explained. A lens pitch is represented as Ip, and a deviation amount of a crossing point between a center locus of a neighboring parallax ray and a display position of a character or a two-dimensional image is represented as t. When the optimal projection position of the display position is represented as $z_{nopt}$ and a projection amount where a neighboring parallax ray from a lens and a main ray from a lens adjacent thereto crosses is represented as $z_n$, the following is obtained according to a relationship of a triangle.

$z_{nopt}:z_n=t:Ip$ (17)

Here, in order to attain such a constitution that a neighboring parallax image can be seen at a right position with the eyes of an observer at a horizontal position with the eyes of an observer at a horizontal position, the position of t may exist at a position of one half of a range where a main ray can be seen plus one half of a range where a neighboring parallax image can be seen.

However, since images of neighboring parallax images are seen simultaneously at a center between adjacent main rays, the center is a region where much burr occurs. For this reason, it is preferable that, when the previously described position of t indicates a character existing at least at a position of one half of the region where a main ray is seen, namely, at a position of a boundary between a main ray and a neighboring parallax image, the effect of interpolation can be utilized. FIG. 4 shows an example of X=2.2 parallaxes and 4 parallaxes. That is, $t:Ip=0.5:x$ (18)

is obtained, which indicates a right interpolation image at a right position. Here, when the equations (17) and (18) are combined and a character is displayed at a display position of $z_{nop}=t \times z_n/Ip$ (19)

$=z_n/2x,$ (20)

a right position can be interpolated.

For example, consideration is made about a case that three rays of the main ray 7 and the neighboring parallax rays adjacent thereto are seen evenly.

Image obtained by a main ray: image obtained by neighboring parallax ray=Y0:Y1=1:1

Assuming that a main ray and neighboring parallax rays are seen evenly, Y0+2Y1=x, that is, 3Y0=x According to the equation (7), a stroke amount=66% can be obtained. Thus, in case of the stroke amount of 66%, when x=3 is substituted for the equation (20), a character may be put at a position of $z_{opt}=z_n/6$ (21)

For example, consideration is made about a case that 2.4 parallaxes including neighboring parallaxes can be seen from one lens.

When x=2.4 is substituted for the equation (19), $z_{nopt}=z_n/4.8$ can be obtained.

Here, a measuring method of a stroke amount will be explained. X denotes the number of parallaxes which can be seen per one lens pitch. For example, for measurement of the stroke amount, sub-pixels of R (red), G (green) and B (blue) are written with the same colors in a vertical direction of a lenticular lens and with different colors in a horizontal direction thereof. Then, the same colors are written in the same parallax numbers in an adjacent lenticular lens. By moving a photodiode in a horizontal direction to check regions where respective wavelengths of R, G B are developed intensely at a position of an observer, the stroke amount can be obtained. Further, the observer evaluates bands of the colors subjectively so that the stroke amount can be obtained roughly.

Fourth Embodiment

Figure 2A:
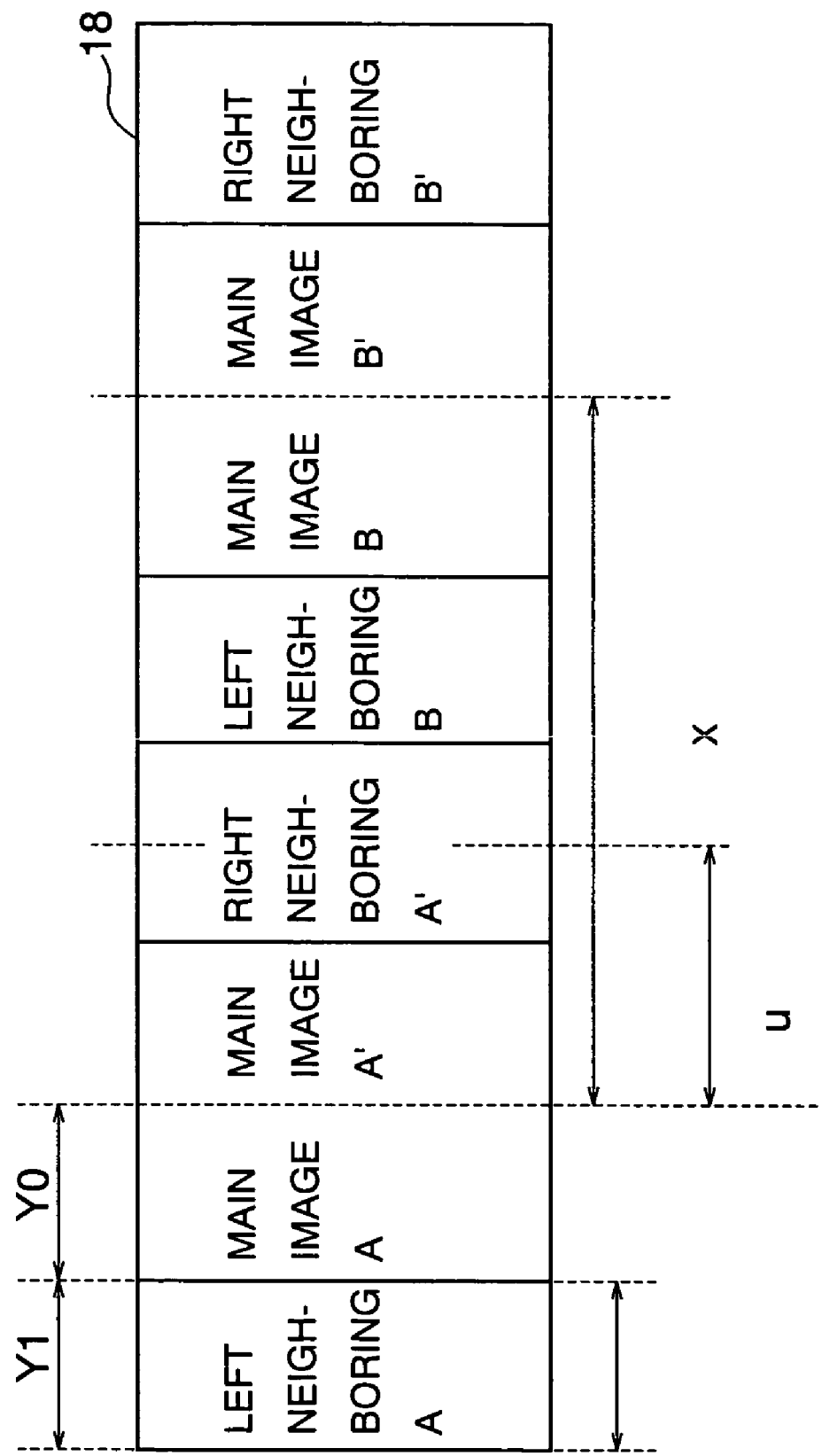
FIG. 2A is an illustrative view illustrating a parallax image entering in the eyes of an observer at a position where he/she can see two main rays.
Figure 2B:
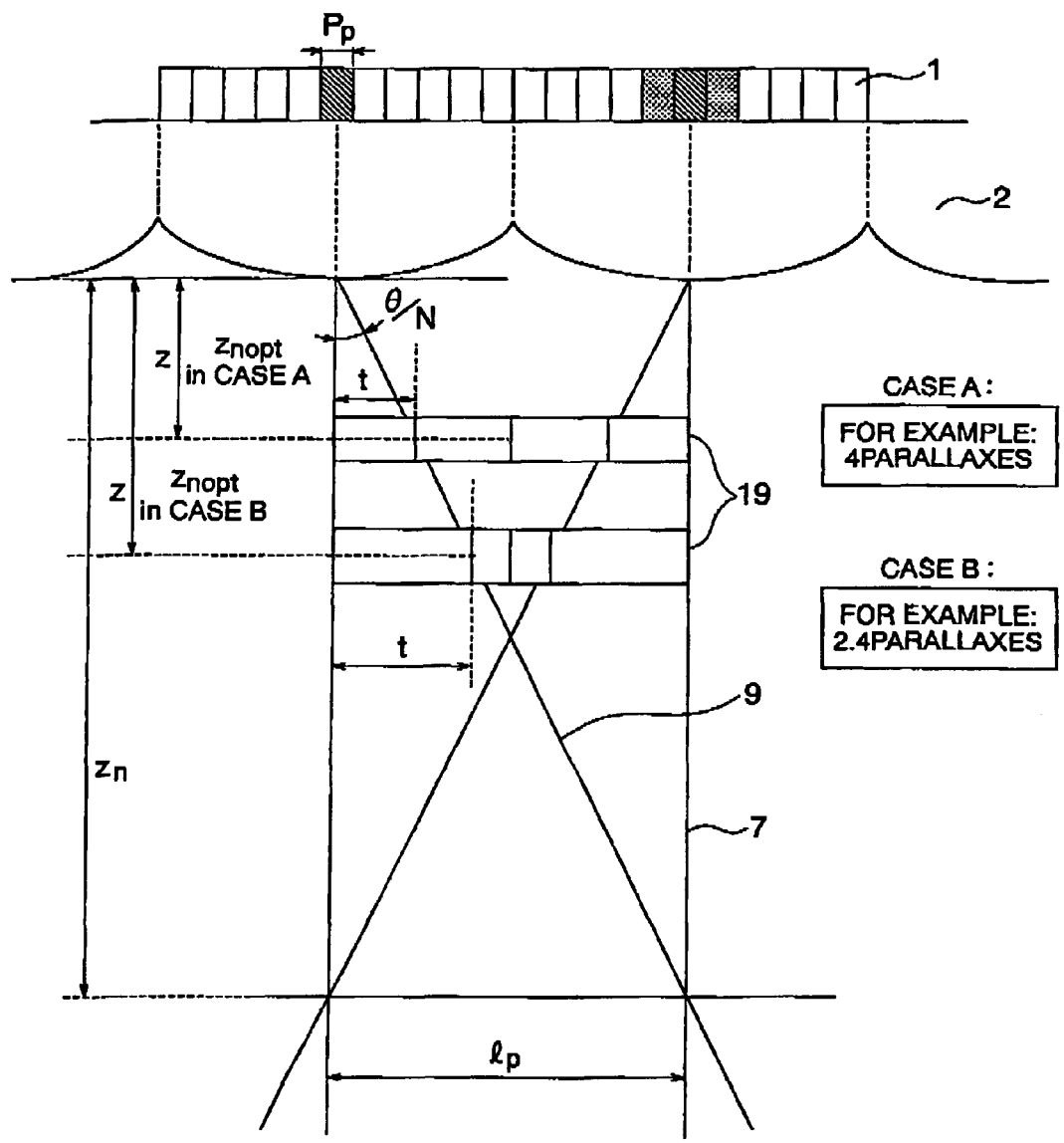
FIG. 2B is a plan view illustrating a constitution of a stereoscopic image display device according to a seventh embodiment.

Next, a stereoscopic image display device according to a fourth embodiment will be explained. There occurs a case that an observer exists at a position that he/she sees two main rays, namely he/she see a black matrix between parallax images at the center position of a lens. FIG. 2A shows parallax images appearing in the eyes of an observer. The optimal position in a display position in such a case will be explained. In FIG. 2B, since a main ray has two parallaxes, a condition that a neighboring parallax image can be seen is to meet X>2 parallaxes.

It will be understood from FIG. 2B that, when the position of the neighboring parallax image meets the following relational equation, the resolution of a character display increases.

$t:Ip=u:x=1:x$ (22)

Further, x denotes the number of parallax images which can be seen from one lens. When the equation (22) is substituted for the equation (19), $z_{nopt}=z_n/x$ (23)

is obtained.

Under such a condition that the center of a lens is positioned on the black matrix, when the optimal position of a character display is calculated using the equation (23) regarding a case that images corresponding to three parallaxes can be seen through one lens, $Z_{nopt}=z_n/3$ (24)

is obtained.

Thus, though images corresponding to the three parallaxes can be seen, the equation (21) and the equation (24) are different in optimal region of a character display position. Thus, in the IP system, either a case that the center portion of the lens is positioned at a center portion of a pixel or a case it is positioned the black matrix between pixels depends on a parallax angle at which an observer sees a stereoscopic display. Strictly speaking, it is desirable that the display position is changed according to the above-described two conditions. However, when a black matrix is seen at the central portion of the screen, brightness is small. Therefore, it should mainly be considered that the equation (21) where the center of the pixel is positioned at the screen center. In this connection, a simulation result described later is obtained using the equation (21).

Here, a case that a neighboring parallax image can be seen is called "crosstalk", which deteriorates a three-dimensional image. The neighboring parallax image is an image which should not be seen. For example, this is because a neighboring parallax image adjacent to a three-dimensional image having violent undulation does not supplement a main ray necessarily. As a two-dimensional character display, however, when there is a correlation between a neighboring parallax image and a main ray, such a correlation can be utilized for improvement in resolution.

Next, in a relationship between a ray density and a focal length of a lenticular which is a feature of the stereoscopic image display device of the embodiment, a method for utilizing a main merit of the embodiment optimally will be explained.

First, a ray density emitted from one lenticular lens and the increase of the resolution are explained.

Figure 26:
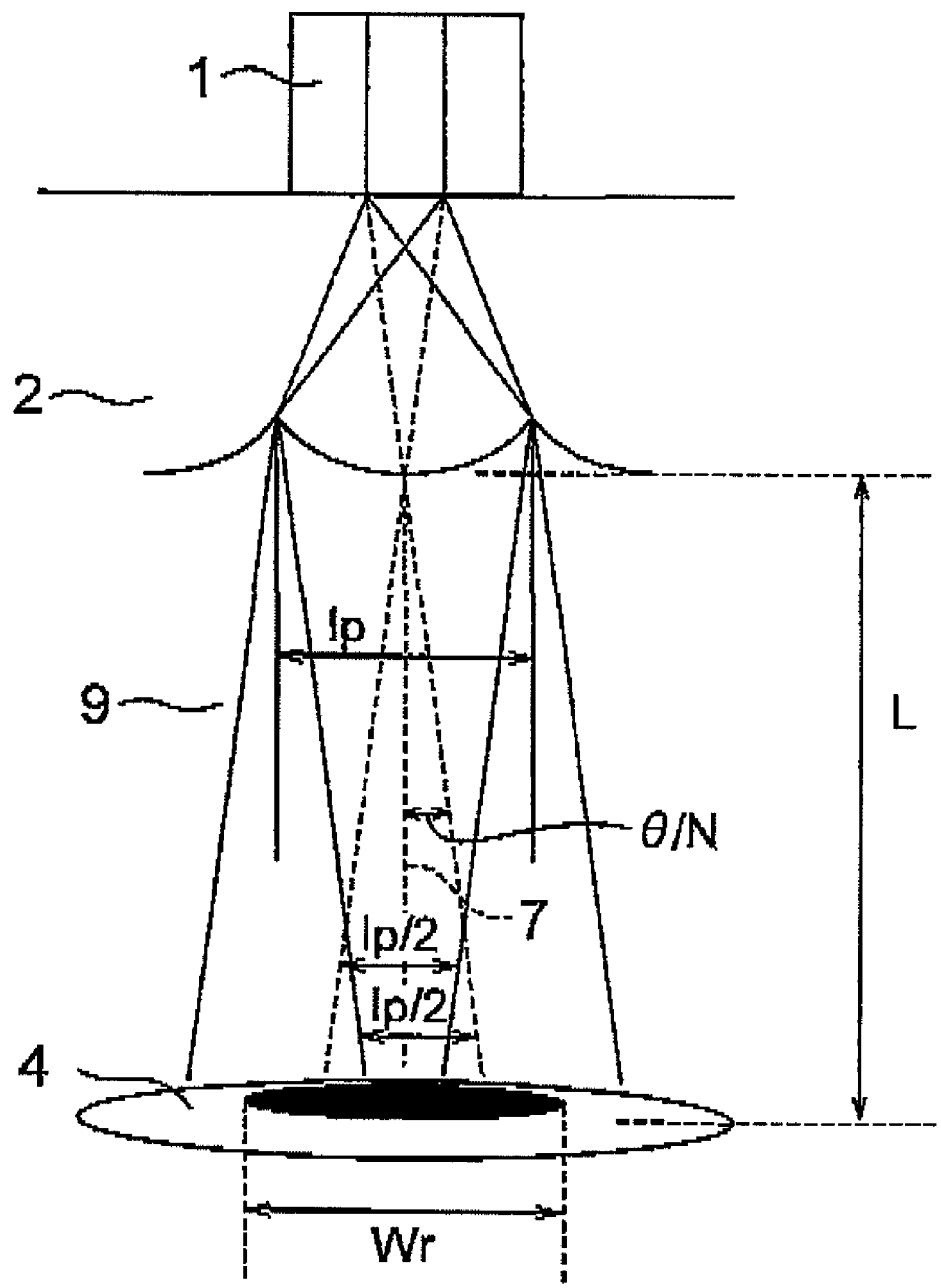
FIG. 26 is a horizontal sectional view illustrating a range where left and right neighboring parallax rays can be seen at a position of an observer in one embodiment of the present invention.

One example of one embodiment of the present invention is shown in FIG. 26. In FIG. 26, an angle formed at the center of a pixel by neighboring parallax images becomes $2\theta/N$, but an angle formed by a center parallax image of a pixel and a boundary between adjacent parallax image becomes one half thereof, namely $\theta/N$. When the angle is sufficiently small, $$\tan\theta = \theta \quad$$

is obtained. Therefore, when N parallaxes, a viewing area angle $2\theta$, viewing distance L, and lens pitch Ip are assumed, a width Wr where a neighboring parallax image can be seen at a viewing distance L can be expressed according to the geographical condition as follows:

$$Wr = 2 \times L \times \tan(\theta/N) - Ip \quad (25)$$

For example, when 32 parallaxes, the viewing field angel angle $2\theta=10°$, the viewing distance L =1 m, and the lens pitch Ip=1.4 mm are assumed, Wr=1.32 mm is obtained. From the above, it is understood that as an angle between neighboring parallax images becomes smaller, i.e., the ray density $\alpha_{imax}$ becomes larger, a ratio where adjacent parallax images enters in the same pupil becomes higher.

For this reason, as the ray density emitted from one lenticular lens becomes larger, a resolution of a three-dimensional display is improved and a resolution of a two-dimensional display can also be improved by using the embodiment.

FIG. 26 shows that, even when the gap from a surface of a lenticular lens to a two-dimensional display device is equal to a focal length of the lenticular lens, as a ray density becomes larger, a neighboring parallax image enters in a pupil or more. An optimal value of a character display in such a case will be described. In case that defocus is not taken in consideration, only rays from a central portion of a pixel may be considered. In FIG. 4, even if defocus due to a lenticular lens is not considered, that is, in case that only center positions of a main ray and an adjacent parallax image are considered when a character is displayed in the projection region, a relationship between the main ray and the neighboring parallax image is revered to a relationship of the parallax number on the two-dimensional display device regarding left and right directions. Further, parallax numbers entering in a pupil are reversed to parallax numbers on the two-dimensional display device regarding left and right directions. For this reason, the relationship between the neighboring parallax image and the main bean entering in the pupil can be put in a matched state when an image is displayed in the projection region. Thereby, it is understood that, when the gap which is the distance for the surface of the lenticular lens to the two-dimensional display device is almost equal to the focal length of the lenticular lens, it is good to perform a character display in the projection region.

Fifth Embodiment

Next, a stereoscopic image display device according to a fifth embodiment of the present invention will be explained.

In the first to fourth embodiments, improvement in resolution of a two-dimensional character has been explained. The result of experiment about a position where a resolution was improved when a two-dimensional character was displayed on an actual stereoscopic image display device is shown.

Figure 12:
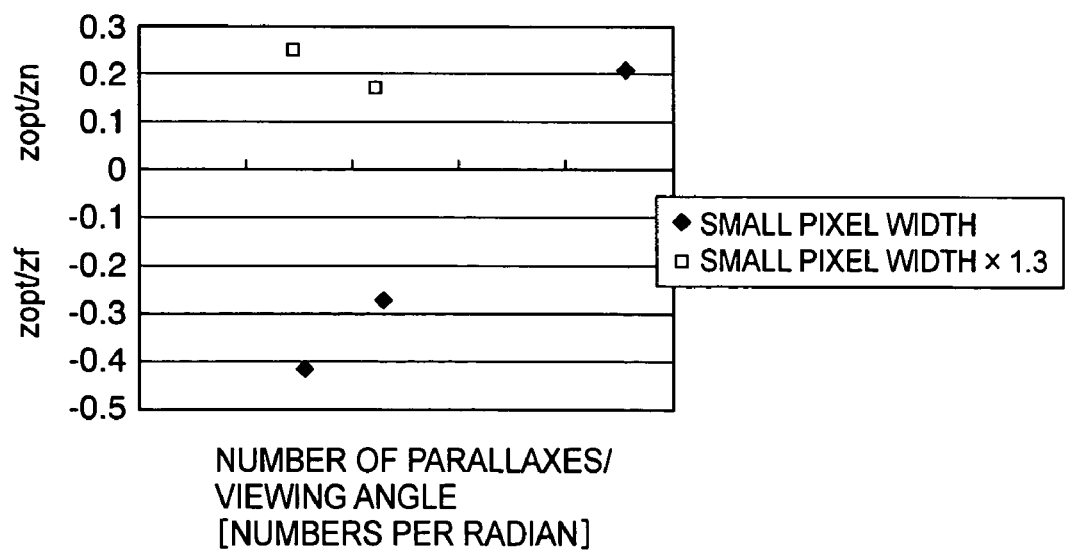
FIG. 12 is a diagram illustrating a relationship between the optimal display position and ray density from one lens pitch.

In FIG. 12, a horizontal axis denotes a maximum ray density $\alpha_{imax}$ per lens (the total number of parallaxes/viewing area angle), and a vertical axis denotes ($z_{opt}/z_n$), which is a ratio of a projection amount $z_n$ in $\beta_{nyq}=\beta_{imax}$ (refer to FIG. 1) to an optimal projection amount $z_{opt}$. In case of the depth region, $z_f$ is substituted for $z_n$. In FIG. 12, by using two kinds of two-dimensional display devices, examination is made about two kinds of pixel widths. Thereby, in the actual two-dimensional display device, it is understood that easy recognition as a character is allowed in the projection region at the condition of $$0.18 < z_{opt}/z_n < 1/4 \quad (26)$$

Further, it is understood that easy recognition as a character is allowed in the depth region at the condition of $$1/4 < z_{opt}/z_n < 0.42 \quad (27)$$

Here, the more the neighboring parallax images look, the more coordinates to be interpolated increase, so that smoothness as a character increases. However, as it is desired to reduce crosstalk in the stereoscopic display device, a certain range is set. Design is made such that parallax images viewed through one lens from 1.24 parallax to 3 parallaxes can be seen. It means $1.24 < x < 3$ in FIG. 1B. This is a case that neighboring parallax image corresponding to 0.12 parallax to 1 parallax can be seen regarding one side neighboring parallax image on the assumption of left and right symmetry. It means $0.12 < Y1 < 1$ in FIG. 1B.

When $1.24 < x < 3$ is substituted in the equation (2), $$z_n/6 < z_{nopt} < 4 z_n/10 \quad (28)$$

is obtained in the projection region, and $$z_f/6 < z_{fopt} < 4 z_f/10 \quad (29)$$

is obtained in the depth region. The equations (28) and (29) includes the equations (26) and (27) which are experimental values. Therefore, the equations (28) and (29) may be considered as a condition for coexistence of a stereoscopic display and a character display.

Next, the value of an actual gap in the stereoscopic image display device of the embodiment will be explained below. Such a condition that the above neighboring parallax image can be seen from 0.12 parallax or more to 1 parallax or less is shown with a relationship with the change of the gap from a lens surface to the two-dimensional pattern display device. The above corresponds to such a condition of 2 parallaxes or more and 5 parallaxes less from one lens.

As described previously, in FIG. 7, the case that the gap is larger than the focal length has been shown, and the change component $\Delta x$ of the gap g in the paraxial ray and the number of defocus parallaxes $\Delta p_n$ are shown in the equation (13).

$$g = f + \Delta x$$

$$f \cos \theta : Ip = \Delta x : \Delta p_n \times p_p$$

$$\Delta pn = Ip \times \Delta x / (f \cos \theta \times p_p) \tag{13}$$

In the equation (13), the condition of $$1.24 < \Delta p_n < 3 \tag{30}$$

is met. Here, the focal length of a lens is represented as f, the lens pitch is represented as Ip, the increment of the gap is represented as $\Delta x$, the number of pixels defocused in a two-dimensional pattern display region is represented as $\Delta p_n$, the viewing area angle is represented as $2\theta$, and the pixel pitch of the two-dimensional display device is represented as $p_p$.

When the equation is solved for $\Delta x$, the value of the gap is changed in the range of $$1.24 \times (f \cos \theta \times p_p)/Ip < \Delta x < 3 \times (f \cos \theta \times p_p)/Ip.$$

The projection position or depth position of a character display at this time are obtained according to the equations (28) and (29). Thereby, the focal length may be added to the above as the value g of the gap. That is, $$f + 1.24 \times (f \cos \theta \times p_p)/Ip < g < f + 3 \times (f \cos \theta \times p_p)/Ip,$$

or $$f - 1.24 \times (f \cos \theta \times p_p)/Ip < g < f - 3 \times (f \cos \theta \times p_p)/Ip$$

may be obtained.

The size of a character is determined according to the number of pixels to be interpolated. That is, in case that one neighboring parallax image adjacent to a main ray on each side of left and right can be seen, it may be considered that the resolution will be increased up to three times. The minimum line width due to lens pitch is set to 12 point character when the width of a lenticular lens is set to the minimum dot on a two-dimensional display without a parallax image. That is, Minimum character width due to lens pitch=$1p \times 12$ is obtained. This may be said to be the same resolution as that of an image displayed on a two-dimensional display plane which does not have any parallax image without a projection and a depth. Assuming that a neighboring parallax image of a character can be seen in a range of 0.12 parallax or more and 1 parallax or less, it can be seen from one lens in a range of 1.24 parallaxes or more and 3 parallaxes or less.

Figure 13:
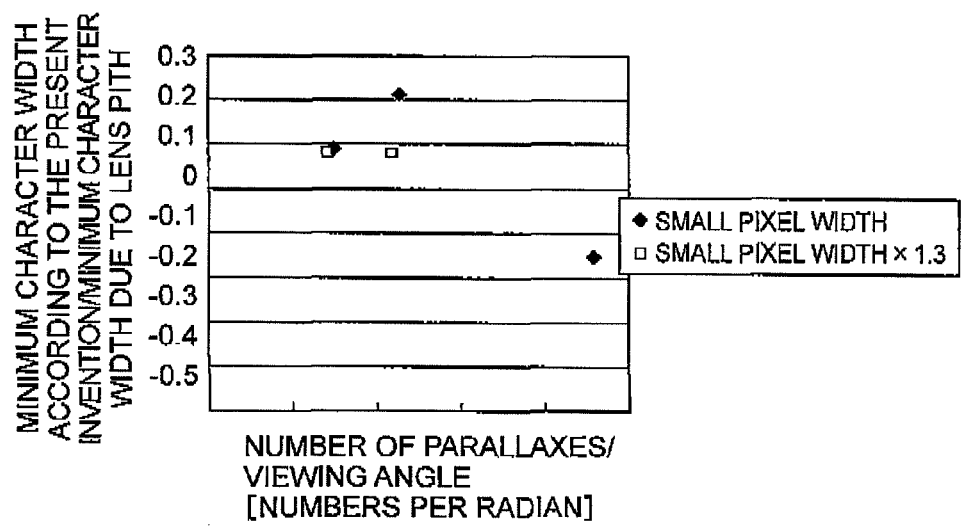
FIG. 13 is a diagram illustrating a relationship between (the minimum character width according to the present embodiment)/(the minimum character width due to the lens pitch)

Ideally, since it is considered that the resolution is in a range of 1.24 times or more to 3 times or less, ⅓<(minimum character width according to the embodiment)/(the minimum character width according to lens pitch) <1/1.24, namely 0.33<(minimum character width according to the embodiment)/(the minimum character width according to lens pitch) <0.81 is obtained as the minimum character width. Some of actually measured values are shown in FIG. 13. From FIG. 13, 0.33<(minimum character width according to the embodiment)/(the minimum character width according to lens pitch) <0.7 is obtained. It has been found that predicted value is approximately coincident with the minimum character width. Further, it has been found that the resolution has been remarkably increased as compared with the resolution of a character displayed on a two-dimensional display plane.

The fact that the defocus of a lens is influenced by the thickness of the gap has been described until now. Next, the fact that the value of the gap varies according to the parallax angle at which an observer sees a stereoscopic display device.

Figure 9:
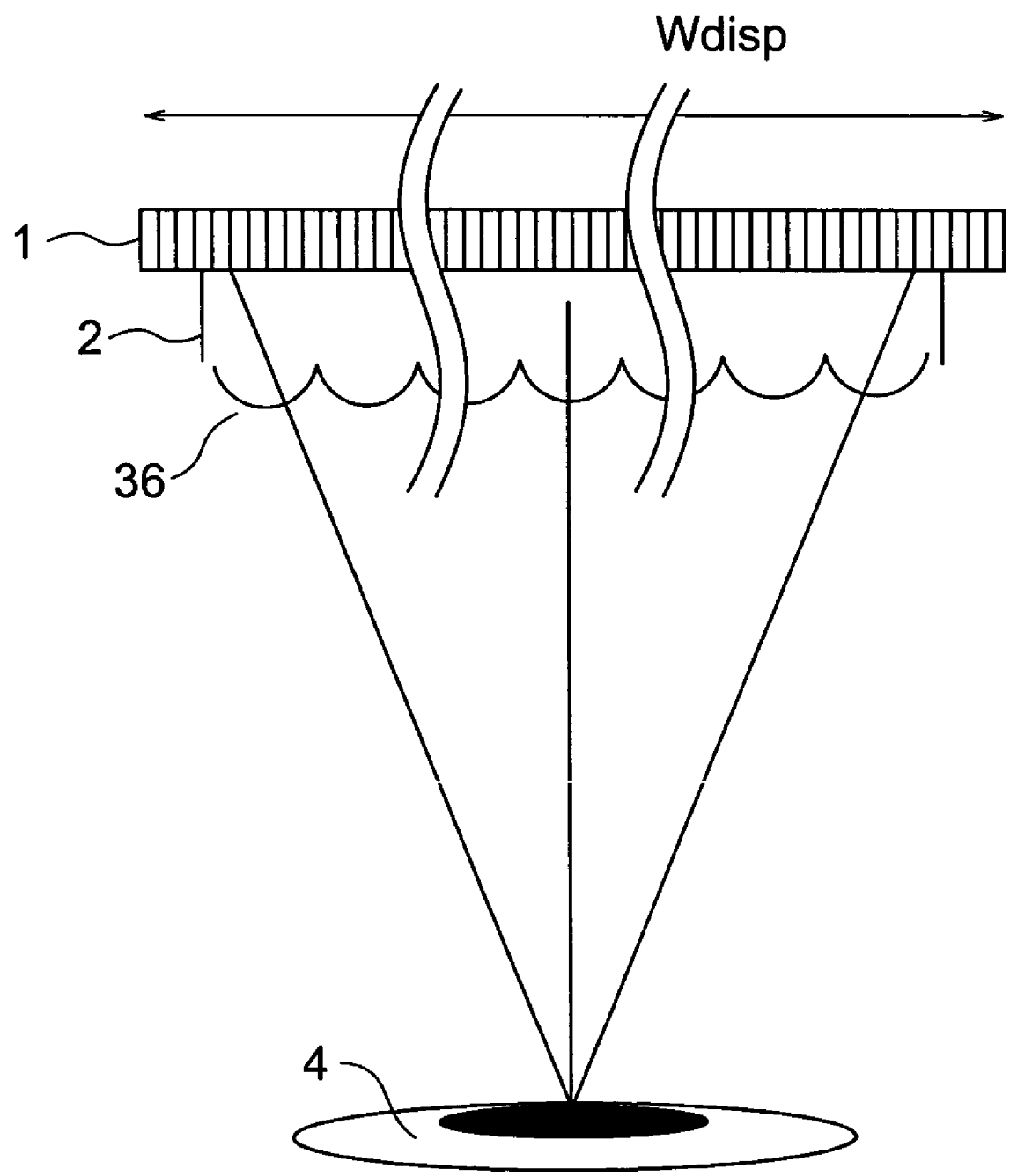
FIG. 9 is a top view of a stereoscopic image display device according to one embodiment.
Figure 23:
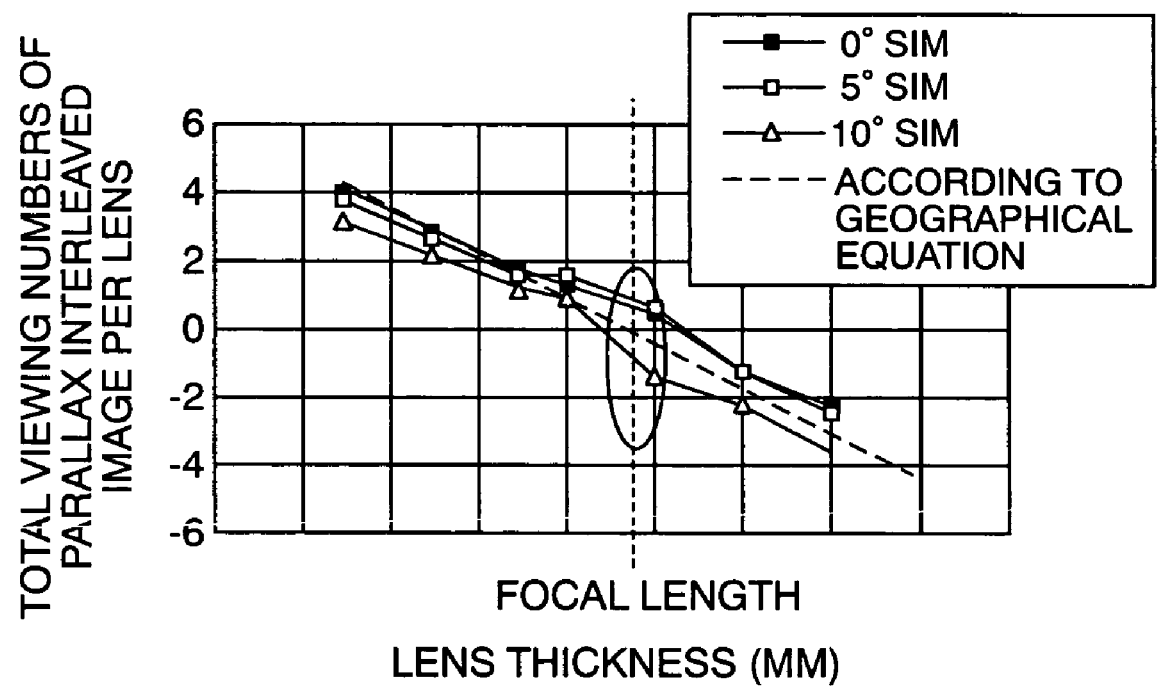
FIG. 23 is a graph showing a relationship between a thickness of a lens and the total numbers of viewing parallax of elemental image array on a two-dimensional display device.

FIG. 9 is a plan view of a stereoscopic image display device according to one embodiment of the invention. When an observer sees a stereoscopic display device, a value of a gap at each end of a screen becomes larger than a gap at the front of the screen. Therefore, examination about how a focal region on a two-dimensional pattern display plane is defocused when an angle of a ray incident on a lens face takes 0°, 5° and 10° is made according to an optical simulation. In FIG. 23, a horizontal axis denotes a thickness of a lens and a vertical axis denotes the total numbers of viewing parallax of elemental image array on a two-dimensional display device. For example, regarding a region marked by a circle, the focal length of the lens and the value of the gap are the same in case that the parallax angle is 0° or 5°, and the defocus is as small as 0. However, in case that the parallax angle is 10°, defocus corresponding to 2 parallaxes of a liquid crystal display device serving as the two-dimensional display device appears. From the above, when a stereoscopic display is made at a central portion and a character display is made at end portions, crosstalk is reduced at the central portion and smooth character display utilizing neighboring parallax images can be performed at an end portion. Further, in case that a displayed is viewed obliquely in a left or right direction, it should be considered that the length of the gap becomes larger when parallax images are produced. That is, it is preferable that assignment of parallax images is prepared in consideration with the length of the gap.

Figure 10:
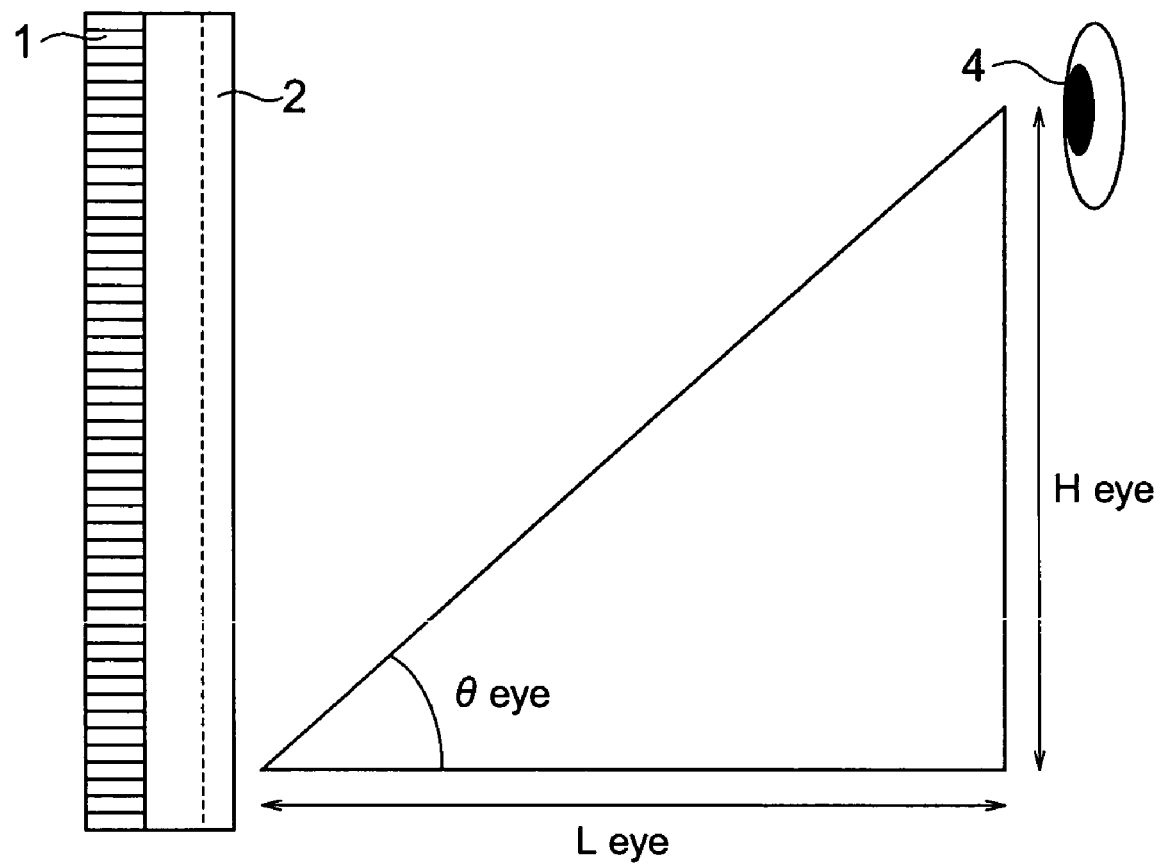
FIG. 10 is a side view of a stereoscopic image display device according to one embodiment.

FIG. 10 shows an example where a stereoscopic image display device according to one embodiment of the present invention has been viewed from its one side. A case that an observer views a display obliquely downward or obliquely upward will be shown.

It is understood that, when an observer views the display in a upper direction with an elevation angle θeye, the gap between the surface of the lens to the two-dimensional display device is smaller than the case that the display is viewed from the front.

Figure 11:
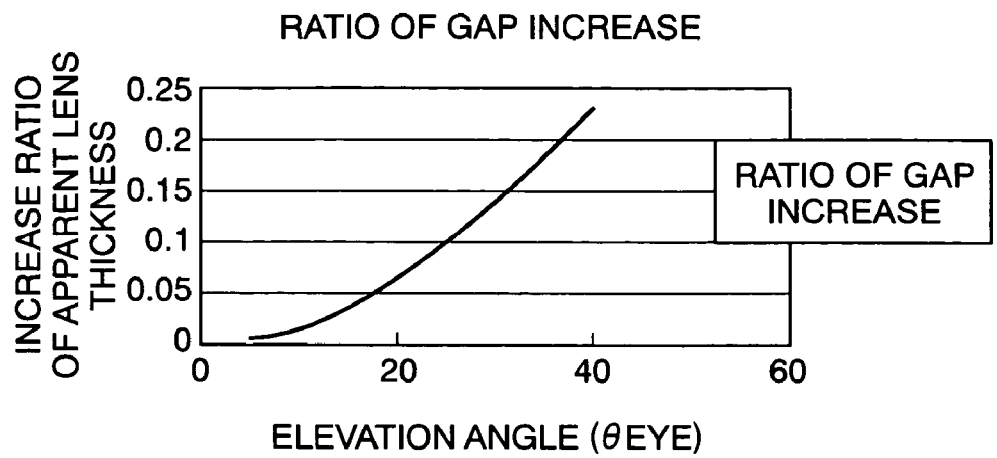
FIG. 11 is a diagram illustrating a change ratio of an angle at which an observer sees a stereoscopic image display device and a gap.

FIG. 11 shows a relationship with an elevation angle θeye (a gap seen obliquely/a gap seen from the front). A gap seen obliquely at an elevation angle of 20° varies by 5%. Thus, a desired gap can be obtained according to the elevation angle. Further, since there is not a curve of a lens in a vertical direction, the converging point of light rays varies from the vertical direction to the oblique direction on the two-dimensional display. That is, even if the gap between the lens and converging point of light rays on the two-dimensional display the position forming the focal point becomes longer, since a seeing position has the same parallax number, re-computation of a parallax map is not required.

Sixth Embodiment

A stereoscopic image display device according to a sixth embodiment of the invention will be explained with reference to FIG. 22. In case that a character display position is fixed, for example, at a lower side of a screen like a telop display, a gap is made approximately equal to the focal length of a lens and an neighboring parallax image is not seen in a stereoscopic display region. Neighboring parallax images are positively seen in a character display by making the gap thick or thin on only the lower side of the screen as in the fifth embodiment. Further, at this time, the thickness of the gap in the character display region varies between a screen center and a screen edge when the screen is seen at a position of an observer. This is because the number X of parallax images per one lens varies between the screen center and the screen edge. Therefore, a character easier to see can be displayed by the number of parallax images X to finely adjust the character display position depending on a region on which a character is displayed on the screen.

Further, the defocus of a lens is promoted by insertion of a diffusion film.

Figure 14:
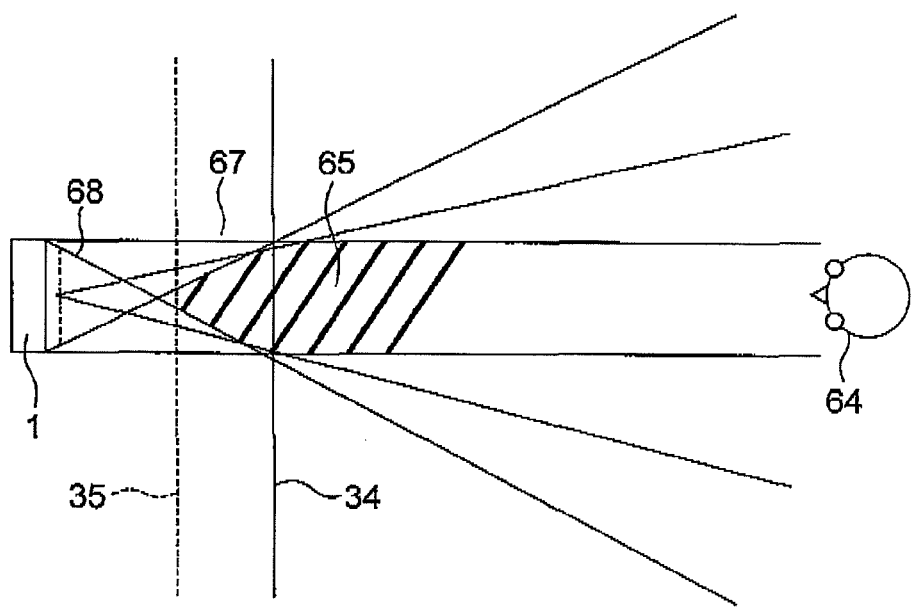
FIG. 14 is a diagram illustrating a relationship between a three-dimensional image display region and viewing area from which a false image can not be seen.
Figure 24:
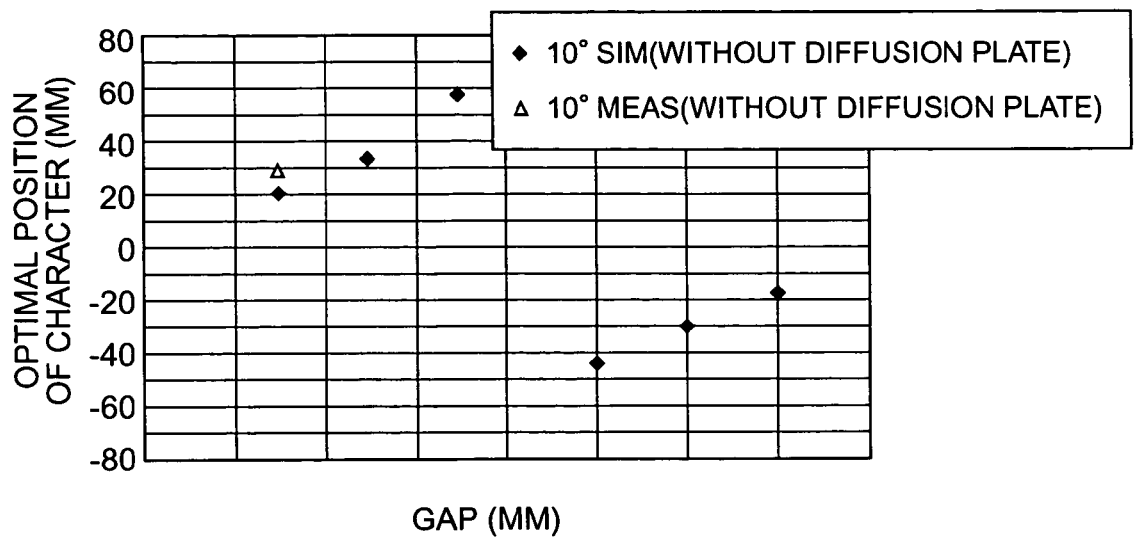
FIG. 24 is a graph showing a relationship between the optimal position of a character and a gap simulated and actually measured without a diffusion film.
Figure 25:
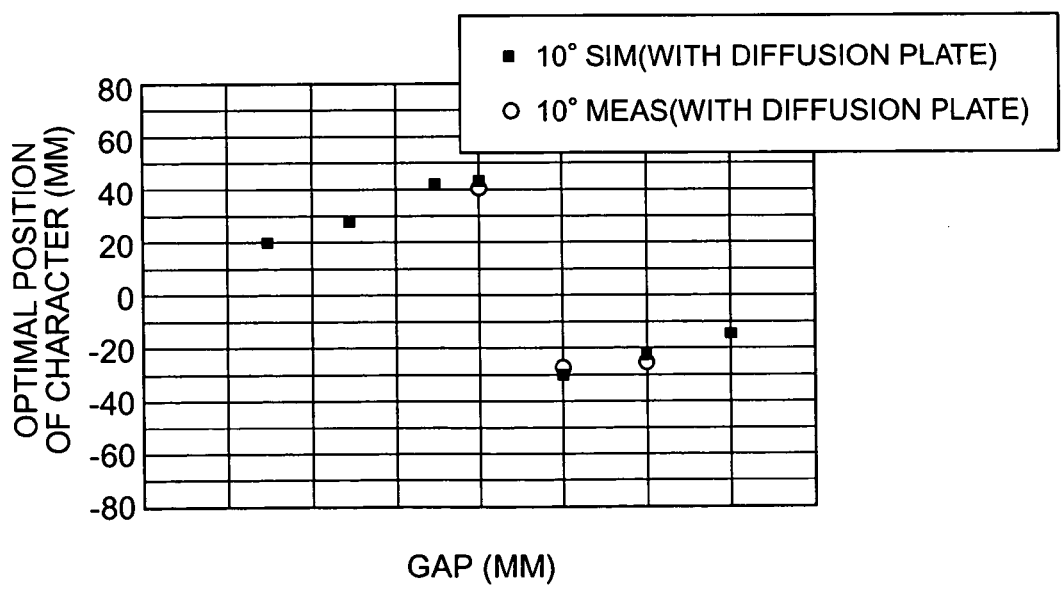
FIG. 25 is a graph showing a relationship between the optimal position of a character and a gap simulated and actually measured with a diffusion film.

A simulation result and an actually measured result about a gap and an optimal position of the character or two-dimensional image in the projected region or the depth region in case that a diffusion film has not been inserted in a space from a surface of a lens to a two-dimensional display device are shown in FIG. 14. Further, a simulation result and an actually measured result about a gap and an optimal position in case that a diffusion film has been inserted in the space are shown in FIG. 25. Both of FIG. 24 and FIG. 25 show actually measured values and correspond to a case that a character has been displayed on an end portion of a screen for example the oblique region is 10°. As a procedure, defocus of a lens due to a thickness of a lens and a diffusion film is estimated by simulation and experiment. Next computation of a display position of a character is performed using the equations explained in the third embodiment on the basis of a ratio of a neighboring image entering in the eyes of an observer.

As understood from FIG. 24, in a region where the gap becomes equal to the focal length and crosstalk is reduce, the optimal position of a character is separated from the screen and it is out of focus as an image. Therefore, such a region is a region which is not suitable for a character to be interpolated by neighboring parallax image rays as mentioned above.

Next, as understood from FIG. 25, the number of parallax images included in one lens are increased and the optimal position of a character is caused to approach toward the screen by inserting a diffusion film. In a case shown in FIG. 25, the role of the diffusion film is to meet the condition that the number of parallax images which can be seen through one lens increases by 0.5 parallax.

FIG. 24 and FIG. 25 show actually measured values as 10° meas. From these figures, it is found that actual measured values and simulation values are approximately coincident with each other.

Seventh Embodiment

Next, a stereoscopic image display device according to a seventh embodiment of the invention will be explained.

The improvement in resolution has been described until now. In this embodiment, a visible area which allows a normal stereoscopic image to be seen will be described. That is, in the embodiment, an example of a visible area expansion due to change of a viewing distance of a character is shown.

For example, a stereoscopic image display device is often set in a viewing distance where many persons can see a screen thereof, and a viewing distance at a time of image production is set to 1 m or longer in many cases. On the other hand, as a character becomes smaller, when the viewing distance is made larger, an angle of viewing to the character becomes small, which causes such a problem that it becomes difficult to recognize the character. Therefore, it is made easy to recognize a character by setting a viewing distance corresponding to the position of an observer. It is understood from the above document JP2001-333437A that an angle of viewing to a character is preferably 30 minutes.

Figure 15:
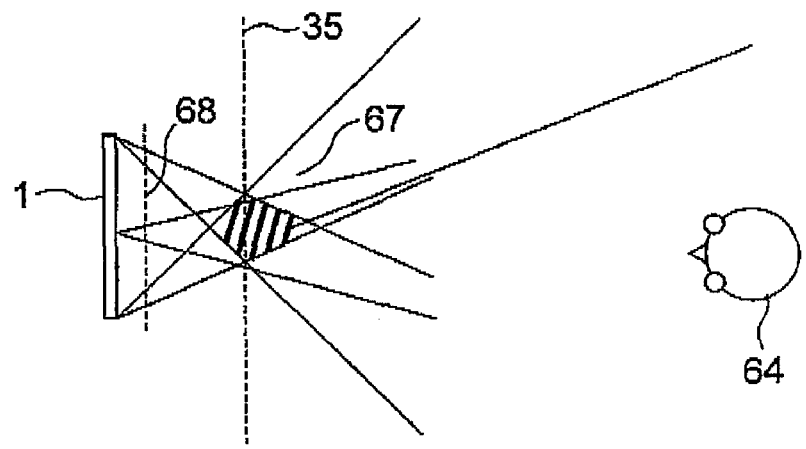
FIG. 15 is a diagram illustrating a relationship between a three-dimensional image display region and a visible area from which a false image of a two-dimensional image can not be seen.

For example, the angle of viewing obtained by computation about a case that the viewing distance and the character width have been set to 1 m and 7 mm becomes 19 minutes, which causes difficulty to see. Therefore, in case that, while 1m is maintained for stereoscopic display, an observer moves to a distance of 70 cm from a display for character display, the field angle becomes 30 minutes, which results in easiness to see. Here, even if the observer only moves to a distance close to the display, the visible area is made much narrow at a position 35 shown in FIG. 14, which causes such a risk that a false image enters in one of the eyes of the observer 64. As illustrated in FIG. 15, when the observer 64 sees a character with a distance close to him/her, the viewing distance in a direction of the display is widened at a distance close to the display by shortening the viewing distance at a time of character production and moving a direction of the visible area toward a center with the same viewing area angle, so that an excellent character display without a false image can be made. The above can be made possible even using the same lenticular lens by changing an image mapping on a two-dimensional display device, so that a good character display is performed without changing equipment. Further, since it is desirable that a stereoscopic display of an image is viewed by many persons, the viewing distance may be maintained in 1 m or longer. In FIG. 14 and FIG. 15, reference numeral denotes a viewing distance at a time of stereoscopic image production, reference numeral 35 denotes a position where a two-dimensional character is displayed, reference numeral 65 denotes a visible area where a normal three-dimensional image can be seen, and reference numeral 67 denotes a ray.

Figure 16:
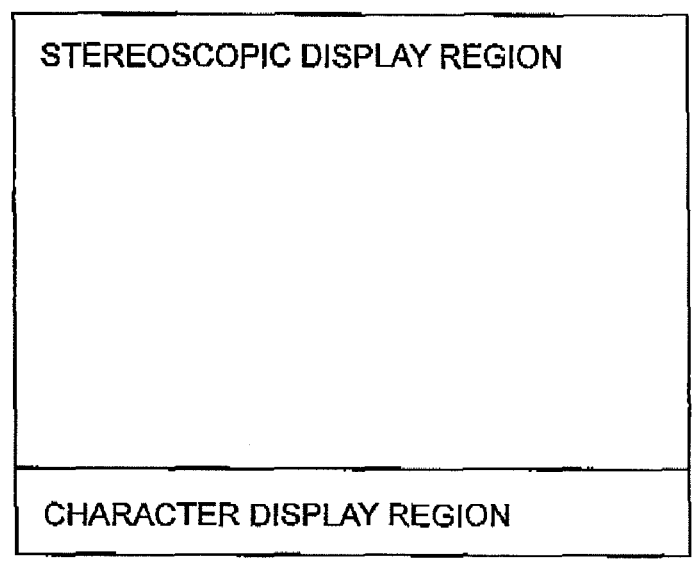
FIG. 16 is a diagram illustrating a display example of a stereoscopic image display device according to one embodiment of the present invention.

FIG. 16 shows a view obtained by composing FIG. 14 and FIG. 15 on one screen. For example, as illustrated in FIG. 16, when a character is displayed on a lower stage, even a small character can be recognized by setting a stereoscopic display on an upper side to a long viewing distance such that many persons shown in FIG. 14 can see the character and displaying the character on a lower side in a viewing distance corresponding to the position of the observer shown in FIG. 15. Here, when the viewing distance of the character display is represented as $L_{chara}$, the position of the character display is set as follows:

$$0<z<L_{chara} \times D/(1+D)/2$$

is obtained in the projection region, and $$0<z<L_{chara} \times D/(1-D)/2$$

is obtained in the depth region.

Here, D is a depth factor, and when the pitch of the lens 2 is represented as Ip, the viewing area angle is represented as $2\theta$ and the pixel pitch is represented as $p_p$, $$D = \frac{(l_p)^2}{2Lp_p\tan(\theta)}$$

is obtained.

Figure 17:
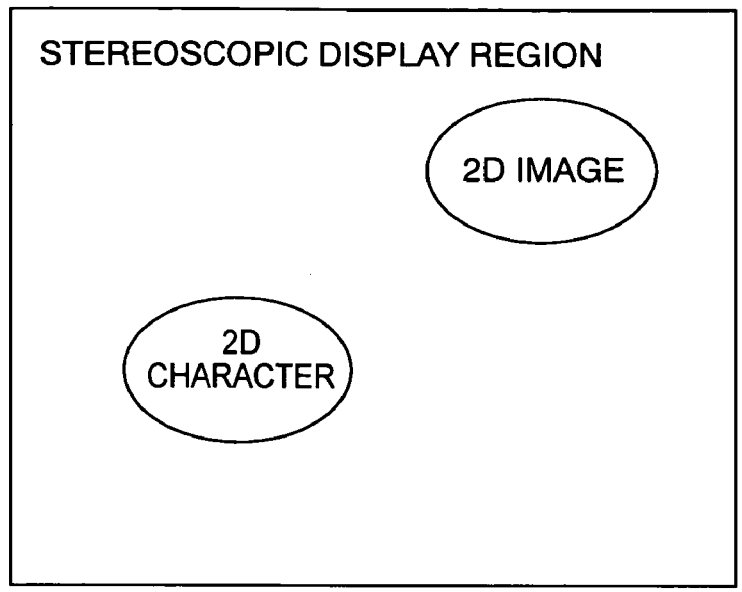
FIG. 17 is a diagram illustrating another display example of a stereoscopic image display device according to one embodiment of the present invention.
Figure 18:
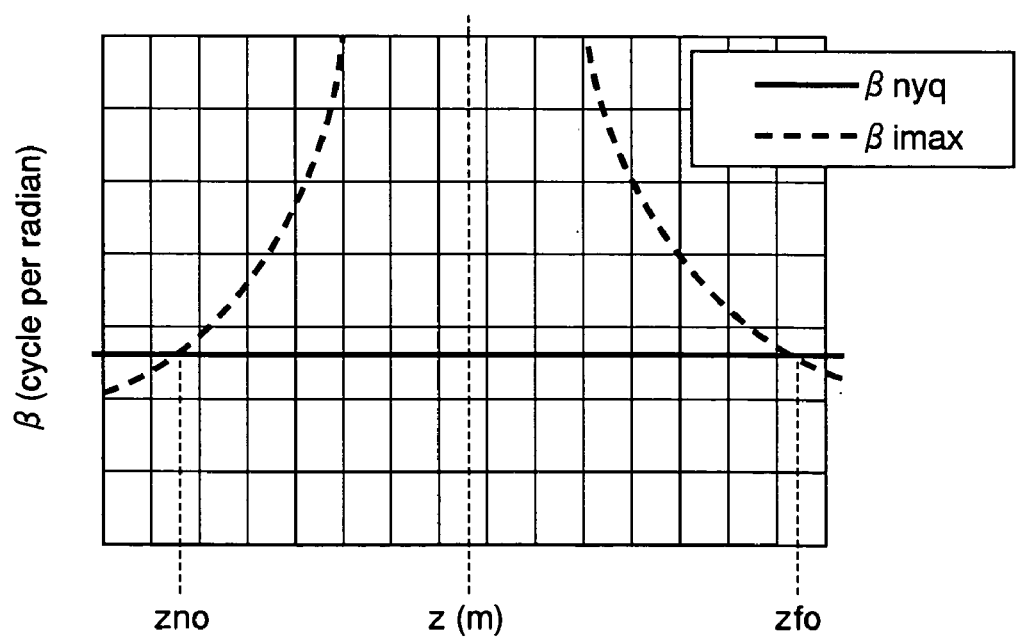
FIG. 18 is a graph illustrating a relationship between positions in a projection direction and a depth direction of an object displayed on a stereoscopic image display device and a resolution.
Figure 19A:
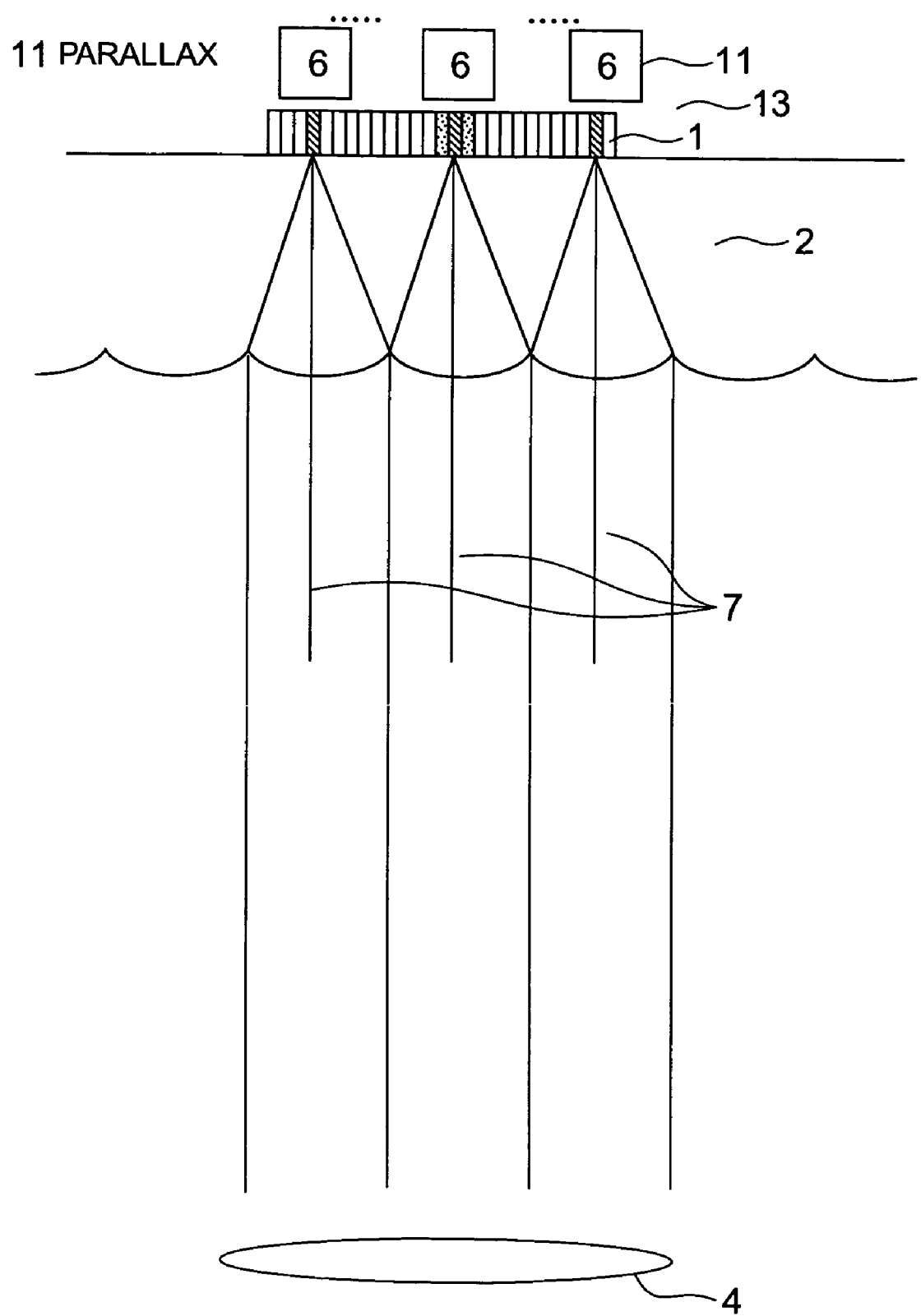
FIG. 19A is a locus diagram of rays when a two-dimensional character or a two-dimensional image has been displayed in a stereoscopic image display device.
Figure 19B:
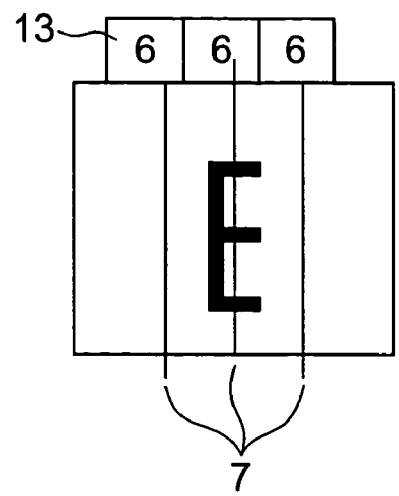
FIG. 19B is a elemental image array on the two-dimensional image display device.
Figure 19C:
FIG. 19C is a diagram of a viewing parallax number entering in the pupil of an observer.
Figure 19D:
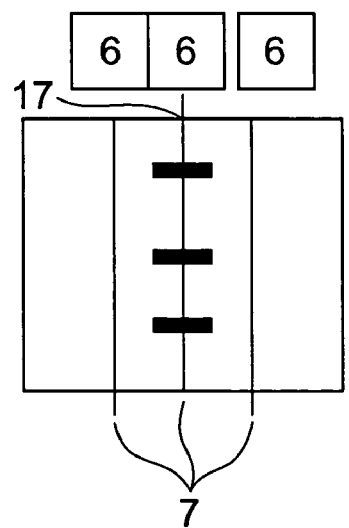
FIG. 19D is a view illustrating two-dimensional character entering in the pupil of an observer.
Figure 20:
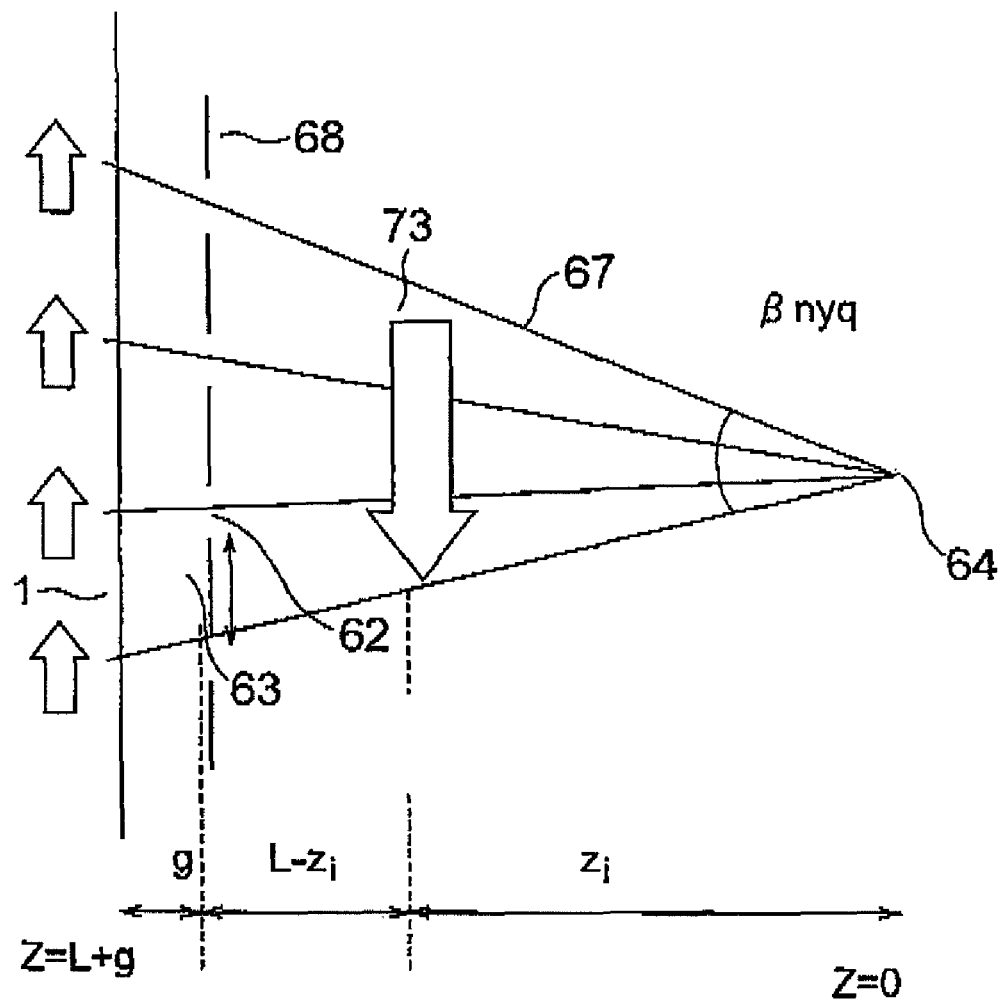
FIG. 20 is a plan view for explaining a resolution depending on a Nyquist frequency in an IP method.
Figure 21:
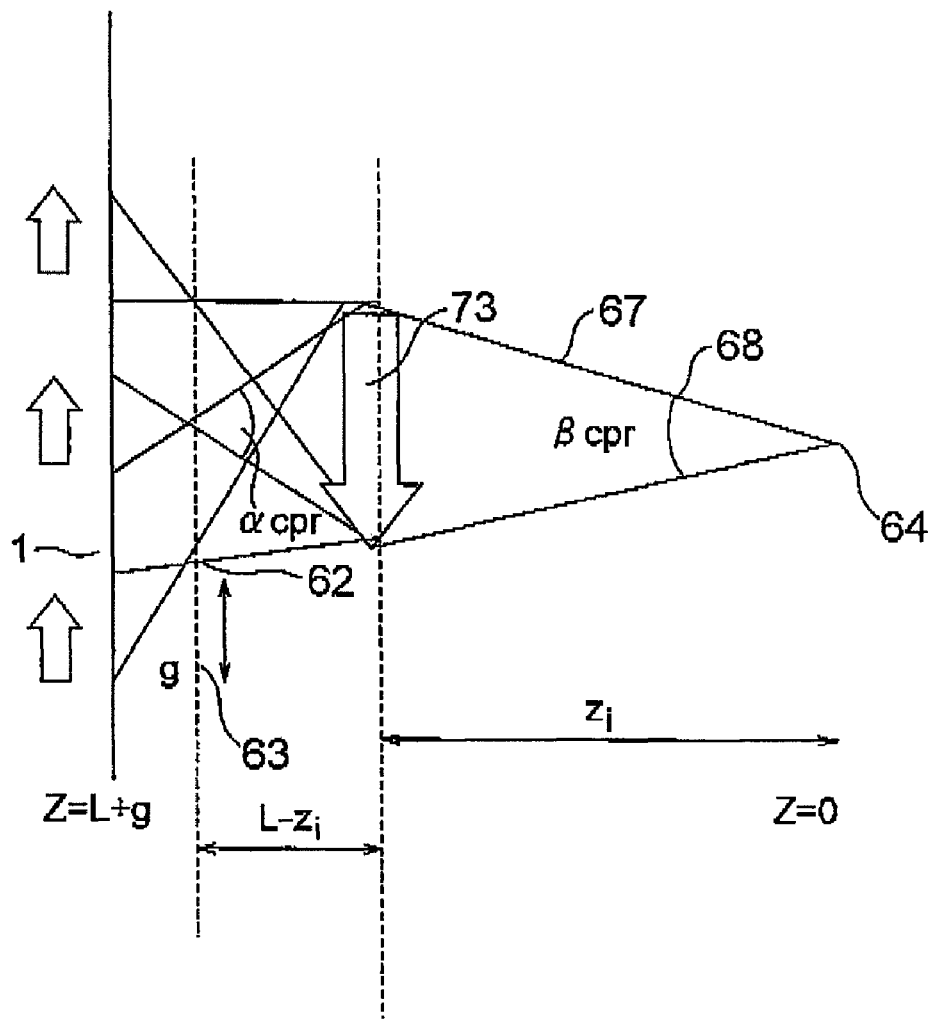
FIG. 21 is a plan view for explaining a resolution depending on ray density emitted from one lens in the IP method.
Figure 22:
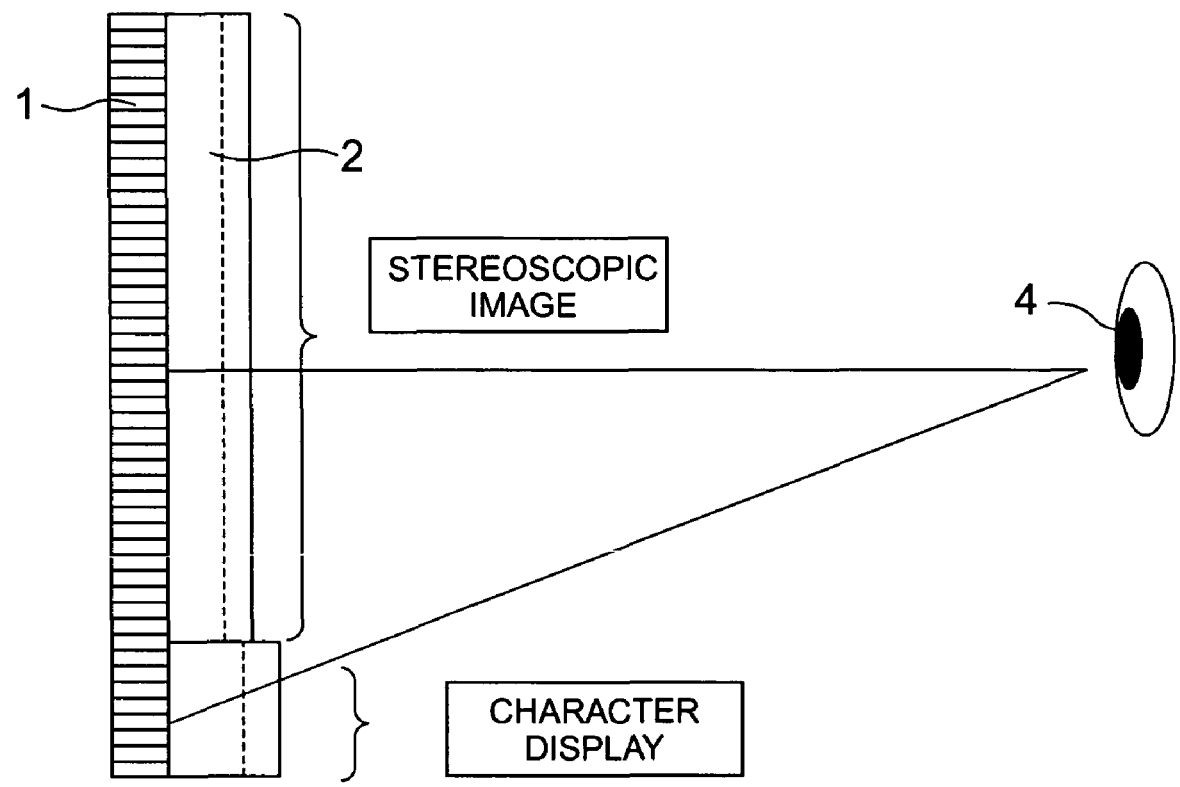
FIG. 22 is a view for explaining a stereoscopic image display device according to a sixth embodiment of the present invention.

FIG. 16 is different from FIG. 22, and it is for changing the gap seen obliquely by changing the viewing distance L and changing the angle of elevation without changing the gap thickness of the gap. Further, as the parallax angle becomes more acute, the gap becomes thicker, so that assignment of parallaxes corresponding to the gap length within the screen may be preformed according to the gap thickness. For example FIG. 17 illustrates a display example obtained by a stereoscopic image display device according to one embodiment of the present invention.

As explained above, according to the embodiments of the inventions, since a resolution of a character or a two-dimensional image can be improved through a lenticular lens, display of the character on the same screen as a screen displayed with a stereoscopic image can be made possible.

As the two-dimensional display device of the embodiment, such a flat display as a liquid crystal display, an organic EL display, a FED (Field emission display) or the like has been described, but the two-dimensional display device to be used is not limited to these flat displays The embodiment uses a lenticular lens as the ray control element, and it is further effective in a stereoscopic image display device where a continuous image which does not include a light shielding portion can be obtained according to a place where an observer sees an image like the lenticular lens.

When a slit is used as the ray control element, for a case that an opening portion is set to be larger than a pixel width, and so on, the embodiment is further effective in a stereoscopic display device where it is easy to see a neighboring parallax image.

The embodiment can be applied to even a case that the lenticular lens or the slit serving as the ray control element is arranged to the two-dimensional display device obliquely.

The embodiment is constituted such that a neighboring parallax image entering in a single eye supplements for a main ray. There is a method for supplementing rays insufficient for each of the left and right eyes. However, as compared with a case that supplementation is performed for a signal eye, fatigue may occur in an observer due to unbalance between left and right images. Therefore, it is desirable that a character can be recognized with a single eye.

Finally, in the above embodiments, a representative value for the optimal position of a character has been described, and a region in the vicinity of the representative value means a region where a character is seen easily, of course.

As explained above, according to each embodiment, since the resolution obtained when a two-dimensional character or a two-dimensional image is viewed through a lenticular lens can be increased two or three times, more characters can be displayed.

Further, since a two-dimensional character can be displayed simultaneously with a three-dimensional display, display can be performed on a screen independent to the portions thereof. Moreover, a two-dimensional character which is easiest to see can be displayed by changing viewing area angle according to the distance between an observer and a three-dimensional display device, and the length of a two-dimensional character.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concepts as defined by the appended claims and their equivalents.

What is claimed is:

1. A stereoscopic image display device comprising:
   a two-dimensional image display device having a plurality of pixels arranged within a display plane; and
   a ray control section provided on a front plane of the display plane and having a lenticular lens including a plurality of lenses arranged side by side, for controlling rays from the pixels,
   wherein when a stereoscopic image is displayed, a plurality of first images each including at least three parallax images for displaying the stereoscopic image are displayed on the two-dimensional image display device, each of the plurality of first images being assigned to one of the plurality of lenses, and
   when a two-dimensional character or a two-dimensional image is displayed, a plurality of second images each including at least three parallax images for displaying the two-dimensional character or the two-dimensional image are displayed on the two-dimensional image display device, two or more of the plurality of second images being observed through one of the plurality of lenses,
   wherein a distance z from a lens surface of the ray control section to a position where the two-dimensional character or the two-dimensional image is displayed satisfies the relationships:
   0<z<L ×D/(1+D)/2, when the two-dimensional character or the two-dimensional image is displayed in a first region located on one side of the ray control section opposite from the two-dimensional image display device; and
   0<z<L ×D/(1+D)/2, when the two-dimensional character or the two-dimensional image is displayed in a second region located opposite from the first region with respect to the ray control section,
   wherein L represents a distance from the lens surface of the ray control section to an observer located in the first region, and a depth factor D satisfies the relationship $$D = \frac{L}{2p_p(L/l_p)^2\tan\theta}$$

where $l_p$ represents a pitch of the lenses, $2\theta$ represents a viewing area angle, and $p_p$ represents the pitch of the pixels.

2. A stereoscopic image display device according to claim 1, wherein:
   when a gap between a plane on which the plurality of lenses are arranged side by side and the two-dimensional image display device, is equal to or larger than a focal length for imaging rays directed to an observer at a viewing distance on the plurality of pixels on the two-dimensional image display device, a character or a two-dimensional image is displayed in the first region; and when the gap is smaller than the focal length for imaging rays directed to the observer at the viewing distance on the plurality of pixels on the two-dimensional image display device, a character or a two-dimensional image is displayed in the second region.

3. A stereoscopic image display device according to claim 2, wherein:
one main ray and two or more adjacent parallax images can be seen at a position of an observer in the viewing distance via one lens of the plurality of lenses, the main ray being a light ray emitted from one of the plurality of first images, and
the number of parallax images visible through the one lens is represented as x, when the gap is equal to or larger than the focal length of the one lens, displaying is performed at a position $z_{nopt}$ in the first region; and
when the gap is smaller than the focal length of the one lens, displaying is performed at a position $z_{fopt}$ in the second region;
wherein the position $z_{nopt}$ and the position $z_{fopt}$ satisfy the relationships $z_{nopt}=z_n/(2x)$ and $z_{fopt}=z_f/(2x)$, where $z_n=L \times D/(1+D)$ and $z_f=L \times D/(1-D)$.

4. A stereoscopic image display device according to claim 3, wherein the position $z_{nopt}$ and the position $z_{fopt}$ are in ranges of $z_n/6 < z_{nopt} < 4z_n/10$ and $z_f/6 < z_{fopt} < 4z_f/10$.

5. A stereoscopic image display device according to claim 3, wherein the gap is in a range of
$f+1.24 \times (f \cos \theta \times p_p)/\mathrm{Ip} < g < f+3 \times (f \cos \theta \times p_p)/\mathrm{Ip}$, when a two-dimensional character or a two-dimensional image is displayed in the first region, or
$f-1.24 \times (f \cos \theta \times p_p)/\mathrm{Ip} < g < f-3 \times (f \cos \theta \times p_p)/\mathrm{Ip}$, when a two-dimensional character or a two-dimensional image is displayed in the second region,
where g is a thickness of the gap, and f is a focal length of the one lens.

6. A stereoscopic image display device according to claim 3, wherein the gap in the case of displaying the stereoscopic image is different than the gap in the case of displaying the two-dimensional character or the two-dimensional image.

7. A stereoscopic image display device according to claim 2, wherein:
two main rays and two or more adjacent parallax images can be seen at a position of an observer in the viewing distance via one lens of the plurality of lenses, the two main rays being light rays emitted from two adjacent images of the plurality of first images;
the number of parallax images visible through the one lens is represented as x, when the gap is equal to or larger than the focal length of the one lens, displaying is performed at a position $z_{nopt}$ in the first region; and
when the gap is smaller than the focal length of the one lens, displaying is performed at a position $z_{fopt}$ in the second region,
wherein the position $z_{nopt}$ and the position $z_{fopt}$ satisfy the relationships $z_{nopt}=z_n/x$ $z_{fopt}=z_f/x$, where $z_n=L \times D/(1+D)$ and $z_f=L \times D/(1-D)$.

8. A stereoscopic image display device according to claim 7, wherein the position $z_{nopt}$ and the position $z_{fopt}$ are in ranges of $z_n/6 < z_{nopt} < 4z_n/10$ and $z_f/6 < z_{fopt} < 4z_f/10$.

9. A stereoscopic image display device according to claim 7, wherein the gap is in a range of
$f+1.24 \times (f \cos \theta \times p_p)/\mathrm{Ip} < g < f+3 \times (f \cos \theta \times p_p)/\mathrm{Ip}$, when a two-dimensional character or a two-dimensional image is displayed in the first region, or
$f-1.24 \times (f \cos \theta \times p_p)/\mathrm{Ip} < g < f-3 \times (f \cos \theta \times p_p)/\mathrm{Ip}$, when a two-dimensional character or a two-dimensional image is displayed in the second region,
where g is a thickness of the gap, and f is a focal length of the one lens.

10. A stereoscopic image display device according to claim 7, wherein the gap in the case of displaying the stereoscopic image is different than the gap in the case of displaying the two-dimensional character or the two-dimensional image.

* * * * *